United States Patent

[11] 3,630,023

| [72] | Inventors | Jeffrey M. Lazar<br>South St. Paul;<br>Robert R. St. John, North St. Paul, both of Minn. |
|---|---|---|
| [21] | Appl. No. | 770,446 |
| [22] | Filed | Oct. 24, 1968 |
| [45] | Patented | Dec. 28, 1971 |
| [73] | Assignee | Honeywell, Inc.<br>Minneapolis, Minn. |

[54] FLUIDIC ENGINE CONTROL APPARATUS
14 Claims, 6 Drawing Figs.

[52] U.S. Cl......................................... 60/39.28,
137/81.5
[51] Int. Cl...................................... F02c 9/04,
F02c 3/00
[50] Field of Search........................................... 60/39, 28;
137/81.5

[56] References Cited
UNITED STATES PATENTS

| 3,295,316 | 1/1967 | Beatrice et al............... | 60/39.28 |
| 3,302,398 | 2/1967 | Taplin et al................. | 60/39.28 |
| 3,383,038 | 4/1968 | Bouthe........................ | 60/39.28 |
| 3,488,948 | 1/1970 | Cornett et al................ | 60/39.28 |

*Primary Examiner*—Samuel Feinberg
*Attorneys*—Charles J. Ungemach, Ronald T. Reiling and Charles L. Rubow ABSTRACT: A fluidic gas turbine engine control system comprising a speed error circuit, a temperature error circuit, a stall error circuit and a control circuit. The speed, temperature and stall error circuits provide error signals indicative of the difference between (1) engine speed and a reference speed, (2) actual engine temperature and a maximum temperature limit, and (3) an engine stall signal and a stall reference signal. The error signals are supplied to the control circuit which controls fuel flow to the engine in response to only that one of the signals which commands the smallest fuel flow.

INVENTORS
ROBERT R. ST. JOHN
JEFFREY M. LAZAR
BY Ronald T. Reiling
ATTORNEY

INVENTORS
ROBERT R. ST. JOHN
JEFFREY M. LAZAR

BY Ronald T. Reiling

ATTORNEY

FLUIDIC ENGINE CONTROL APPARATUS

The invention herein described was made in the course of or under a contract, or subcontract thereunder, with the Department of the Air Force.

BACKGROUND OF THE INVENTION

This invention related generally to control apparatus and more specifically to fluidic apparatus for controlling the operation of power systems including gas turbine engines.

In the operation of a gas turbine engine, it is normally advantageous for the fuel flow and/or other independent operating variables to be controlled in response to a selected engine speed or power output. For the purposes of this specification, independent operating variable is defined to be an operating variable which can be directly controlled. In addition, if the selected speed is changed, the independent operating variable should be controlled such that the actual engine speed is brought into agreement with the selected speed at the fastest rate allowable for the engine. However, at all times the independent operating variable or variables must be controlled to prevent excessive speed, temperature and/or other operating limitations. Further, upon a call for acceleration, the independent operating variable or variables must be controlled to prevent an unstable flow condition through the compressor known as compressor stall and/or surge.

Until recently, development of gas turbine engine control systems which allow optimum engine performance has been severely hampered due to the lack of adequate sensors and sensing techniques. Sensing of the various parameters necessary to provide optimum engine control has presented difficult problems because of the extremely severe environments in which sensing is required, the very fast response times and high accuracies required of the sensors, and the complete absence of feasible methods for sensing certain parameters. For example, no feasible direct method for sensing incipient compressor stall has yet been developed. It has, however, been found that an impending stall warning signal can be generated from the functions of corrected engine speed and corrected turbine inlet temperature. For the purposes of this specification, corrected engine speed is defined to be $N/\sqrt{\theta}$ where N is the actual rotational velocity of the compressor in r.p.m. and $\theta$ is the actual temperature of the air entering the compressor in degrees Rankine divided by 520. Corrected turbine inlet temperature is defined to be $\sqrt{T/\theta}$ where T is the actual temperature at the inlet to the turbine in degrees Rankine. It should be noted that although the functions $N/\sqrt{\theta}$ and $\sqrt{T/\theta}$ have been found useful for indicating stall, other similar functions of speed and temperature can also be used.

In this technique, compressor speed and temperature of the air entering the compressor are sensed and signals indicative thereof are utilized to generate the corrected engine speed $N/\sqrt{\theta}$. The function $N/\sqrt{\theta}$ is related to a reference corrected turbine inlet temperature below which stall will not occur. This temperature is defined to be the incipient stall temperature. The turbine inlet temperature and the temperature of the air entering the compressor are sensed and signals indicative thereof are utilized to generate the corrected turbine inlet temperature $\sqrt{T/\theta}$. The difference between the corrected turbine inlet temperature signal and the incipient stall temperature signal, then, represents a stall error signal indicative of the stall condition of the compressor.

In order to use this technique, it should be noted that it is necessary to accurately sense very high turbine inlet temperatures within the engine. It should be further noted that in order to preclude the possibility that a transient stall condition will be encountered, the response time of the temperature sensor must be very short. The use of temperature sensors having very short response times is additionally necessitated by the requirement that actual engine temperature must not, even momentarily, exceed the maximum temperature limit dictated by the structural properties of the engine. Prior art temperature sensors capable of measuring temperatures as high as those encountered at the turbine inlet are not satisfactory for this purpose for one or more of the following reasons: (1) They do not simultaneously possess adequate accuracies and sufficiently short response times; (2) They are not sufficiently durable and reliable to withstand the extremely severe environment for any substantial period of time; and (3) They are unduly complex and thus unreliable and expensive.

The above stated problems in sensing and sensing techniques have resulted in prior art gas turbine engine control systems having one or more of the following disadvantages: (1) Optimum engine performance is not achieved because the control system has to be derated to insure that the transient value of any operating parameter does not exceed its allowable limit. (2) The engine is not adequately protected against excessive transient values of critical operating parameters. (3) The control systems are excessively complex, resulting in systems which are unreliable, expensive, and heavy.

Various systems have been devised for utilizing fluidic sensors and sensing techniques to provide improved control of gas turbine engines. In general, these systems provide for sensing the most significant operating parameters and applying signals indicative thereof to a control circuit which combines the signals in one of a variety of ways and utilizes the composite signal to control an independent operating variable or variables of the engine. It is, however, apparent that at a given time there is generally only one engine operating parameter which is closest to exceeding its allowable limit. This parameter is defined to be the most critical engine operating parameter. Controlling engine operation only in response to the most critical engine operating parameter always provides the variation in the independent operating variable or variables which results in the fastest engine response consistent with keeping all operating parameters within their allowable limits. This variation is defined to be the most critical variation in an independent operating variable.

In prior art control systems, it is necessary that the signals indicative of each of the engine operating parameters be combined in such a way that the most critical engine operating parameter does not exceed its allowable limit regardless of any combination of values assumed by the remaining operating parameters. In order to insure that the most critical engine operating parameter does not exceed its allowable limit, it is generally necessary to derate the control system so that there is no possibility of such a condition being encountered. Accordingly, it is apparent that prior art gas turbine engine control systems wherein the signals indicative of each parameter sensed are reflected, at least to some extent, in the control signal for the independent operating variable or variables do not provide for optimum engine control.

SUMMARY OF THE INVENTION

The applicant's invention is a closed loop fluidic control system for a gas turbine engine. The control system includes means for providing fluid signals indicative of engine speed, engine temperature, and compressor stall. These signals are supplied to a control circuit which functions to select the signal indicative of only the most critical parameter. This signal alone is then utilized to control the flow of fuel to the engine, and/or other independent engine operating variables such that the parameter associated with the selected signal does not exceed its allowable limit.

The applicant's invention further includes a start control circuit comprising means for sensing engine inlet air pressure and means for controlling the independent engine operating variables in accordance with inlet air pressure and engine speed for engine speeds less than a predetermined speed, indicating a start condition. Further, means is provided for anticipating the steady state values of the engine operating parameters and the steady state settings of the independent engine operating variables during engine acceleration. Signals indicative of the anticipated values of the engine operating parameters and settings of the independent engine operating variables are utilized to prevent overshoot and oscillation of these parameters and variables about their steady state values.

The applicant's invention overcomes the problems of the prior art gas turbine engine control systems as follows. In accordance with the teachings of the applicants'invention, the independent engine operating variables are controlled only in response to the most critical operating parameter. Since only the most critical operating parameter is selected for the control function, none of the operating parameters is permitted to exceed its allowable limit. Further, since the control function in the applicants' invention is responsive to only the most critical operating parameter, it is not necessary to derate the control system as in the prior art and optimum engine performance can be achieved. In accordance with the teachings of this invention, engine control is accomplished with a minimum number of simple, rugged, reliable fluidic components. In addition, the circuit of the present invention has very fast response, thus further enabling it to provide optimum engine performance.

DESCRIPTION OF THE PREFERRED EMBODIMENT

The applicants' control system as disclosed herein is applied to a gas turbine engine, and more particularly, to control the fuel delivered thereto in response to a command signal and various engine operating parameters. For the purpose of this specification, gas turbine engine is defined to include any type of internal combustion engine wherein combustion gases are used to drive at least one turbine therewithin. Gas turbine engines specifically include jet engines wherein combustion gases are first routed through a turbine which drives a compressor within the engine and are then ducted through a thrust-producing nozzle. Gas turbine engines also include engines of the type wherein combustion gases are first routed through a turbine which drives a compressor within the engine and are then ducted into a separate power turbine which provides a mechanical input.

It should be understood that some of the basic computing and sensing components and subsystems of the present invention will have broader application than shown herein. The present description should, therefore, be considered only as illustrative of these components and subsystems.

The applicants' control system for a gas turbine engine controls the fuel flow to the engine in response to a commanded speed or power output. In addition, if the selected speed is changed, the control system brings the actual engine speed into agreement with the selected speed at the fastest rate allowable for the engine. At all times the control system functions to prevent excessive engine temperatures and to prevent excessive engine speeds. Upon acceleration of the engine, the control system minimizes an unstable flow condition through the compressor known as compressor stall and/or surge.

Figure 1:
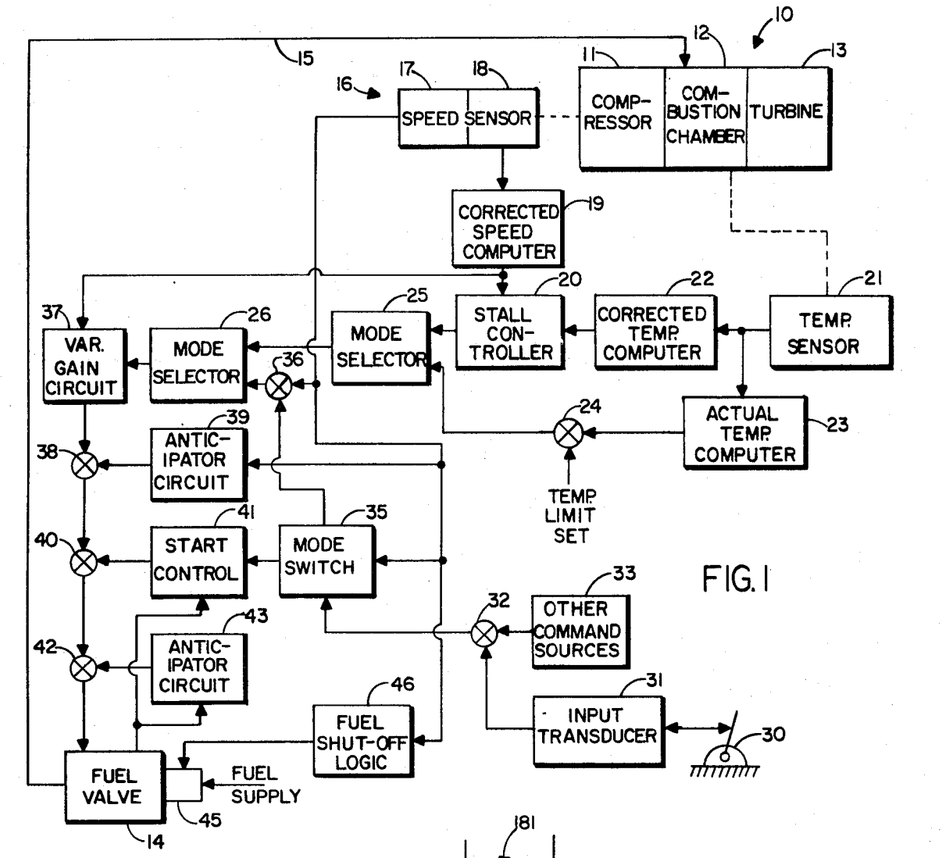
FIG. 1 is a functional block diagram of a gas turbine engine control system wherein only the least critical of the engine speed, temperature, and stall parameters is selected and utilized to control fuel flow to the engine.

The system by which these parameters can be sensed and utilized to achieve optimum performance of a gas turbine engine can be understood by reference to the block diagram of FIG. 1 in which reference numeral 10 generally refers to a gas turbine engine having a compressor 11, a combustion chamber 12 and a turbine 13. Fuel is injected into combustion chamber 12 from a fuel supply (not shown) by means of a fuel valve 14 and a fuel supply conduit 15.

Reference numeral 16 refers to speed-sensing apparatus which is adapted to sense the speed of compressor 11 and/or turbine 13 within engine 10. Speed-sensing apparatus 16 includes an analog speed sensor 17 which produces an analog pressure differential signal indicative of the speed of compressor 11 and/or turbine 13. Speed-sensing apparatus 16 also includes a digital speed sensor 18 which produces a train of fluid pressure pulses having a repetition rate indicative of the speed of compressor 11 and/or turbine 13. The digital speed signal from digital speed sensor 18 is supplied to a corrected speed computer 19 which provides a fluid output signal indicative of the actual engine speed divided by the square root of $\theta$, $N/\sqrt{\theta}$. As previously defined, $\theta$ is the actual temperature of the air entering the compressor in degrees Rankine divided by 520. The function $N/\sqrt{\theta}$ represented by the output signal from corrected speed computer 19 is a corrected turbine inlet temperature below which compressor stall will not occur. The fluid output signal of corrected speed computer 19 is supplied to stall controller 20.

Reference numeral 21 refers to fluidic temperature sensing means which senses engine temperature at the turbine inlet and provides a fluid signal indicative thereof to a corrected temperature computer 22 and an actual temperature computer 23. Corrected temperature computer 22 provides a fluid output signal indicative of the square root of the actual temperature at the inlet to turbine 13 in degrees Rankine divided by the square root of $\theta$, $\sqrt{T/\theta}$. The output signal from corrected temperature computer 22, $\sqrt{T/\theta}$, is supplied to stall controller 20 wherein it is combined with the output signal from corrected speed computer 19, $N/\sqrt{\theta}$. The output signal from stall controller 20 is a stall error signal which represents the difference between the incipient stall temperature and the corrected turbine inlet temperature existing within engine 10. The stall error signal from stall controller 20 is supplied to a first mode selector circuit 25.

Actual temperature computer 23 produces an output signal indicative of the actual turbine inlet temperature within engine 10. The output signal from actual temperature computer 23 is supplied to summing means 24 wherein it is summed with a signal indicative of the maximum actual temperature allowable within engine 10. Summing means 24 produces an output signal which is indicative of the difference between the maximum actual temperature allowable within engine 10 and the actual temperature within engine 10. The output signal from summing means 24 is a temperature error signal which is also supplied to mode selector circuit 25.

Mode selector 25 functions to select the smallest of the stall and temperature error signals from stall controller 20 and summing means 24 and provide only that error signal at its output. The output signal from mode selector 25, which represents the smallest of the stall and temperature error signals is supplied to a second mode selector 26.

In the system illustrated in FIG. 1, the smallest of the stall and temperature error signals represents the most critical of these operating parameters. It is, however, pointed out that in other systems there may also be a minimum temperature requirement. As an example, this may be necessary to prevent flame-out. In such a system, mode selector 25 may be replaced with a median signal selector having three inputs. The inputs signals would then represent stall, maximum temperature error and minimum temperature error. The median signal selector would select the median signal and supply only that signal to the following circuitry.

Reference numeral 30 refers to manual speed selection means whereby a pilot or operator selects a desired engine speed or power output by moving a selector lever. Motion of the lever is transmitted to an input transducer 31 which functions to convert the movement into a fluid signal. The fluid signal from input transducer 31 is supplied to summing means 32 which also receives other fluid signals indicative of commanded speed or power from other command sources 33. Summing means 32 produces a composite output signal indicative of a commanded engine speed as produced both by speed selector 30 and other command sources 33. The output signal from summing means 32 is supplied to a mode switch 35 which transmits the commanded speed signal to summing means 36 if and only if the actual engine speed is greater than a predetermined speed as will hereinafter be discussed.

Summing means 36 functions to sum the actual engine speed with the commanded engine speed and produce a speed error signal indicative of the difference therebetween. The speed error signal is supplied to mode selector 26 which functions in the same manner as mode selector 25 to select and transmit only the smallest of the signals supplied thereto. Accordingly, the output signal from mode selector 26 represents the smallest of the speed error signal and the error signal received from mode selector 25. However, since the output signal from mode selector 25 is, itself, the smallest of the stall and temperature error signals, the output signal from mode selector 26 represents the smallest of the stall, temperature, and speed error signals.

As previously pointed out in the description of mode selector 25, a median signal, rather than the smallest signal, may represent the most critical operating parameter. In the present instance, for example, it may be necessary to maintain at least a predetermined minimum speed to produce proper operation of engine accessories. This requirement can be met by replacing mode selector 26 with a median signal selector and providing a third input signal indicative of minimum speed error in the manner previously described in connection with mode selector 25.

The output signal from mode selector 26 is supplied to a variable gain circuit 37 which modifies the magnitude of the signal in response to the corrected engine speed. The use of variable gain circuit 37 is advantageous in this application because the operating characteristics of a gas turbine engine are such that the maximum increase in fuel flow rate which it can accept while in stable operation varies with corrected speed. More specifically, the greater the corrected speed, the greater the maximum acceptable rate of fuel flow increase.

The output signal from variable gain circuit 37 is the output signal from mode selector 26 modified by the gain of variable gain circuit 37. The output signal from variable gain circuit 37 is supplied to summing means 38. Summing means 38 also receives a signal from a speed anticipator circuit 39 which receives its input signal from analog speed sensor 17. Anticipator circuit 39 functions to anticipate the final steady state engine speed while the engine is accelerating and provides a signal indicative thereof to summing means 38. The effect of the signal provided by anticipator circuit 39 is to minimize overshoot and oscillation of the engine speed about its steady state value. Summing means 38 combines the output signals from variable gain circuit 37 and anticipator circuit 39 and produces an output signal indicative thereof to summing means 40.

Summing means 40 also receives a signal from a start control circuit 41. Start control circuit 41 receives a speed input signal from speed sensor 17 through mode switch 35 only if the actual engine speed is less than a predetermined speed, indicating a start condition. Accordingly, if the actual engine speed is less than the predetermined speed, mode switch 35 transmits the actual speed signal from speed sensor 17 to start control circuit 41 and blocks the commanded speed signal from summing means 32 to summing means 36. Conversely, if the actual engine speed is greater than the predetermined speed, mode switch 35 transmits the commanded speed signal from summing means 32 to summing means 36 and blocks the actual speed signal from speed sensor 17 to start control circuit 41.

Start control circuit 41 operates such that it is inactive unless mode switch 35 is transmitting the signal indicative of the actual engine speed thereto from speed sensor 17. Start control circuit 41 also includes means for sensing the pressure of the air entering compressor 11. Further, start control circuit 41 receives a signal indicative of the position of a metering element within fuel valve 14 and produces an output signal, uniquely related to fuel flow, which serves to control the position of the metering element such that for engine speeds less than the predetermined speed, fuel flow to the engine is controlled in response to only engine speed and the pressure of the air entering the compressor 11. Compressor speed and inlet air pressure provide an indication of the mass flow of air into the combustion chamber 12. Accordingly, a proper fuel to air mixture is maintained in combustion chamber 12 by controlling the fuel supplied thereto in response to the air mass flow thereinto.

The output signal provided by summing means 40 is supplied to summing means 42 which also receives a signal from the second anticipator circuit 43. Anticipator circuit 43 is supplied with an input signal indicative of the position of the metering element within fuel valve 14. Anticipator circuit 43 senses the direction and rate of change of the position of the metering element and produces therefrom an output signal indicative of its anticipated steady state position. The output signal from anticipator circuit 43 is supplied to summing means 42 so as to minimize overshoot and oscillation of the metering element in fuel valve 14 about its steady state position.

Fuel valve 14 includes a shutoff valve 45 for completely shutting off the fuel supply to engine 10 under certain conditions. Shutoff valve 45 is actuated by means of a signal provided by fuel shutoff logic 46 which receives an input signal from speed sensor 17. Shutoff logic 46 functions to cause shutoff valve 45 to completely shut off fuel flow to engine 10 when the actual engine speed is less than a predetermined speed.

With engine 10 operating at normal speeds, mode switch 35 functions to pass the speed command signal from summing means 32 to summing means 36. Accordingly, stall error, temperature error and speed error signals are supplied to mode selectors 25 and 26. Under steady state conditions and conditions of moderate acceleration, the speed error signal which is the difference between the commanded speed and the actual engine speed, is the most critical error signal. Accordingly, the output signal produced by mode selector 26 represents the speed error signal supplied thereto. This signal is modified by variable gain circuit 37 in accordance with corrected engine speed and is then supplied to summing means 38. Under steady state conditions, the actual engine speed remains constant and there is a zero rate of change of engine speed. Accordingly, anticipator circuit 39 supplies no signal to summing means 38 and the output signal of summing means 38 is the signal supplied thereto by variable gain circuit 37.

Further, with engine 10 operating at normal speeds, mode switch 35 functions to prevent the actual speed signal from reaching start control circuit 41. Accordingly, start control circuit 41 is deactivated and supplies no signal to summing means 40. Thus, the output signal of summing means 40 is the signal supplied thereto from summing means 38. The output signal from summing means 40 is supplied to summing means 42. With engine 10 in steady state operation, the position of the metering element within fuel valve 14 remains constant and has a zero rate of change. Under these conditions, anticipator circuit 43 supplies no signal to summing means 42. The signal produced by summing means 42 is, thus, the signal supplied thereto from summing means 40. In steady state operation, the output signal from summing means 42 remains constant and has the value which is necessary to maintain the metering element in fuel valve 14 in its existing position.

If, however, the commanded speed differs substantially from the actual engine speed, the speed error signal may be larger than either the stall error signal or the temperature error signal. Mode selector 26 will, therefore, pass the signal being received from mode selector 25 and block the speed error signal. Mode selector 25 operates to select the smallest of the stall error and temperature error signals. Accordingly, the output signal from mode selector 26 is the smallest of the stall error and temperature error signals. The output signal from mode selector 26 is modified by variable gain circuit 37 and supplied to summing means 38. Since either the stall error or temperature error signal is providing an input to fuel valve 14, engine 10 will tend to accelerate in accordance with that signal. Anticipator circuit 39, will, thus, sense the rate of change of speed of engine 10 and provide a signal indicative thereof to summing means 38. Accordingly, the output signal from summing means 38 will be the composite of the signals received from variable gain circuit 37 and anticipator circuit 39. The output signal from summing means 38 is supplied to summing means 40.

As previously indicated, with engine 10 operating at normal speeds, start control circuit 41 is deactivated and provides no input signal to summing means 40. The output signal from summing means 40 is supplied to summing means 42. Since engine 10 is accelerating, there is a probability that the position of the metering element within fuel valve 14 is changing. The rate of change of position of the metering element within fuel valve 14 is sensed by anticipator circuit 43 which supplies an output signal indicative thereof to summing means 42. The output signals produced by anticipator circuits 39 and 43 always oppose the signal from variable gain circuit 37. Accordingly, a large rate of change of engine speed or a large rate of change in the position of the metering element within fuel valve 14 will result in large signals being subtracted from the output signal supplied by variable gain circuit 37. Thus, engine 10 and the metering element within fuel valve 14 will be prevented from overshooting their steady state speed and position.

The embodiment of the applicants' control system shown in FIG. 1 has been discussed as one in which the smallest of a plurality of error signals is always used alone to perform the control function. It should, however, be noted that the system can also be implemented such that only the largest of the signals indicative of a plurality of parameters is used alone to perform the control function. In such a system, speed, stall and actual temperature signals are generated such that they increase with increasing speed, approaching stall and increasing temperature. The largest of these signals is then selected and supplied to a control system which tends to close the fuel valve as the selected signal increases.

For purposes of this specification, the engine being controlled has been illustrated as one in which all of the compressor stages and all of the turbine stages are mounted on a common shaft and rotate at the same speed. It will be recognized by those skilled in the art that this represents only the simplest type of gas turbine engine. Other well-known engine types may include compressors in which different stages operate at different speeds. In such an engine a different turbine may be employed to drive each compressor stage. Each compressor stage and connected turbine has separate temperature, stall and speed parameters associated therewith. Thus, it may be necessary to employ a plurality of the applicants' basic control systems or portions thereof to achieve the desired control. Some of the above considerations ma also be involved in connection with ancillary units, such as an after burner. Accordingly, more elaborate control systems employing the techniques and a plurality of the applicants' control systems interconnected as necessary are within the scope of the present invention.

A fluidic embodiment of the applicants' control system will hereinafter be described in detail. It is however pointed out that this engine control system, in which an independent operating variable is always controlled in response to only the most critical operating parameter, may also be implemented in other ways, as for example, electrically or mechanically. Further, hybrid implementations including combinations of fluidic, electrical and/or mechanical components are also feasible. The described fluidic embodiment offers certain advantages such as simplicity, reliability and fast response over embodiments implemented with some other types of components, but should be taken as exemplary only.

Figure 2A:
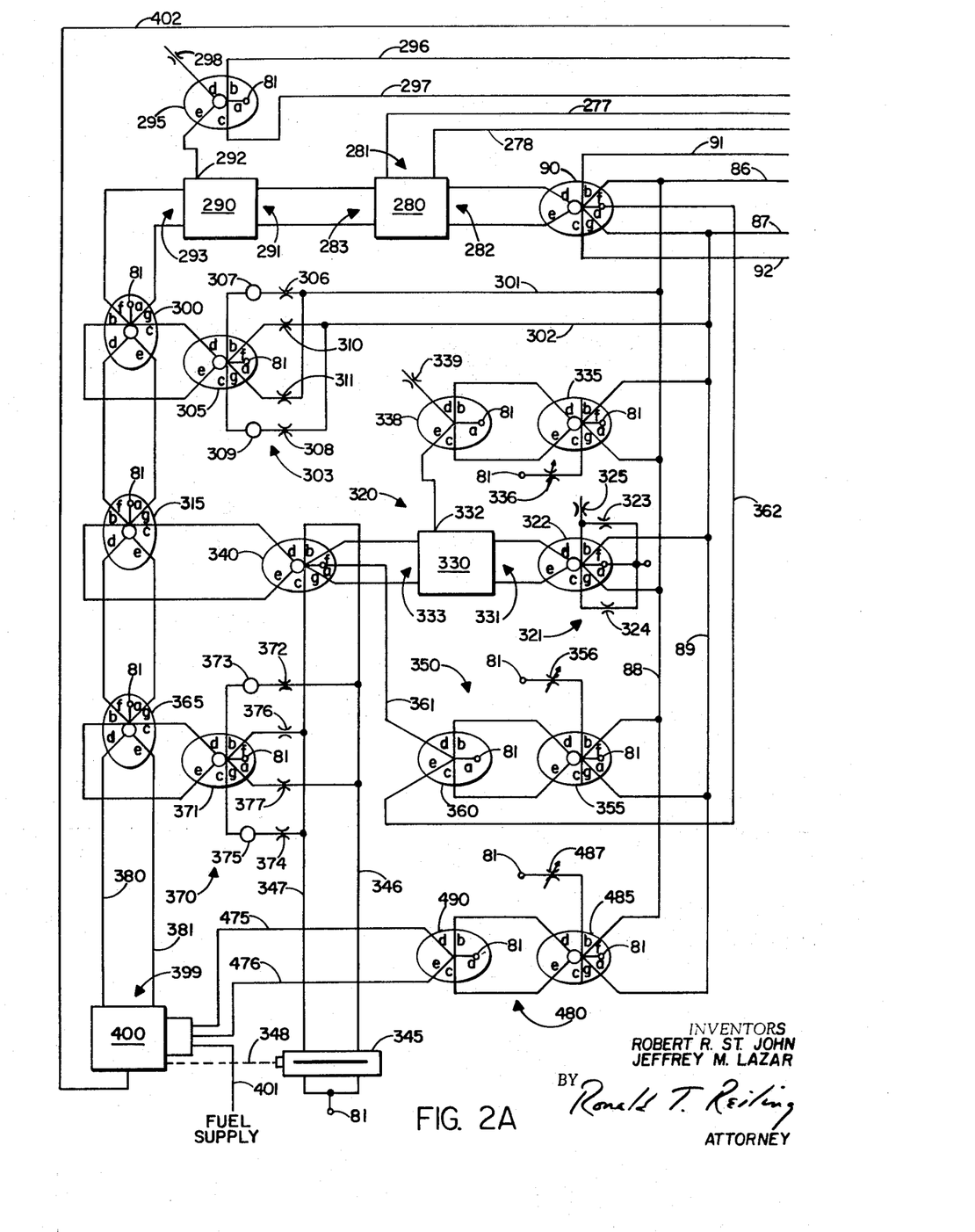
FIGS. 2A and 2B comprise a schematic representation of a fluidic gas turbine engine control system incorporating the teachings of the present invention.
Figure 2B:
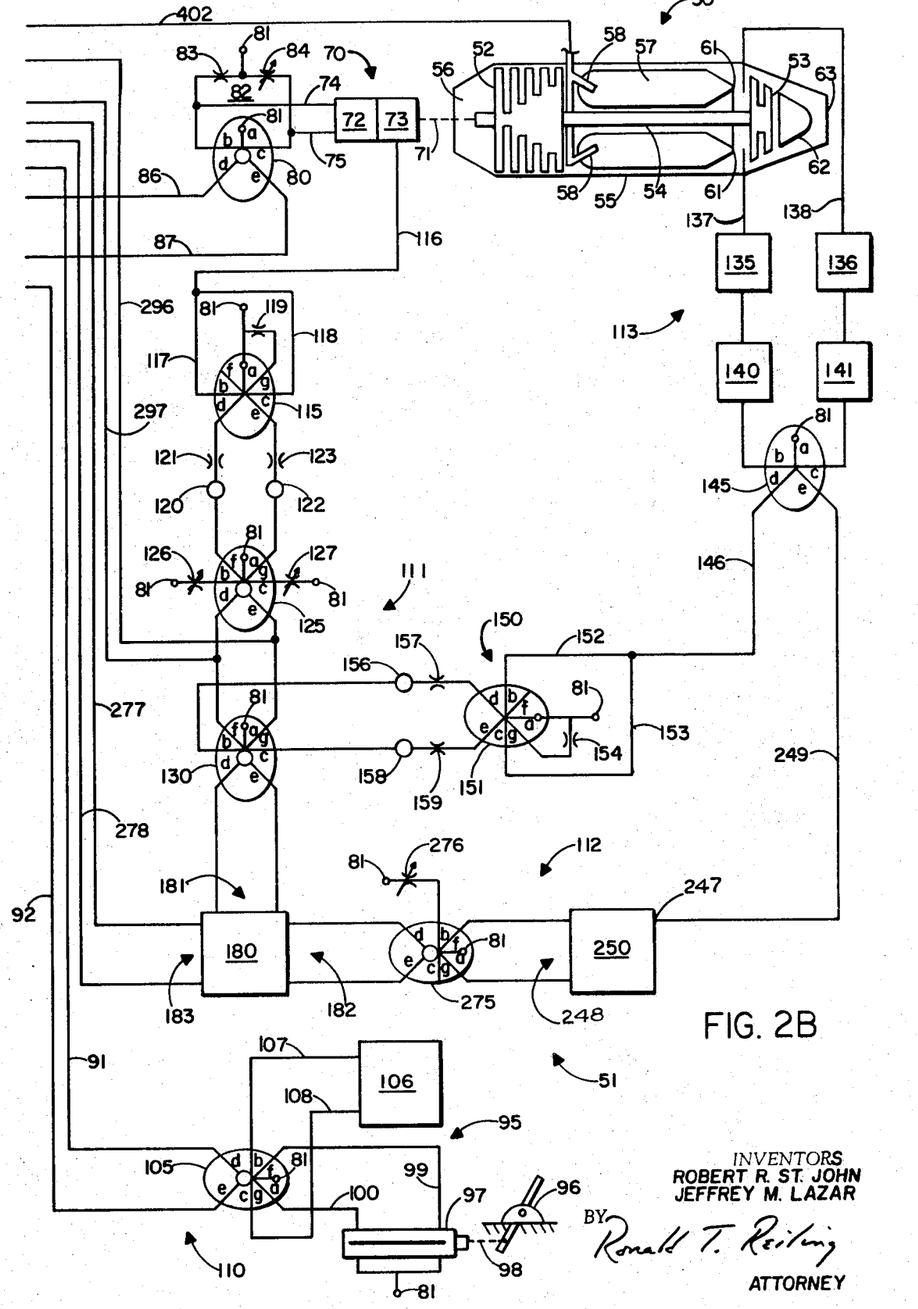

Referring now to the control system of FIGS. 2A and 2B, reference numeral 50 generally designates a turbojet engine. Reference numeral 51 generally designates a fluidic control system for turbojet engine 50. Turbojet engine 50 comprises a compressor 52 and a turbine 53 carried on a common shaft 54 in suitable bearings (not shown) and enclosed in a suitable casing 55. An inlet 56 is provided in casing 55 so as to allow compressor 52 to draw air to supply a combustion chamber 57 surrounding shaft 54 and located between compressor 52 and turbine 53. Fuel is supplied to a plurality of injectors 58 from a fuel supply (not shown) by means of fuel valve apparatus 400 and fuel supply conduits 401 and 402.

Fuel from injectors 58 is mixed with compressed air from compressor 52 in combustion chamber 57 and burned. Additional energy is added to the compressed air in combustion chamber 57 as a result of its increase in temperature and the addition of combustion products. The high-temperature combustion gases then flow through nozzles 61 to turbine 53 which extracts energy therefrom at a rate sufficient to drive compressor 52. Thereafter, the combustion gases are discharged past a fairing 62 and through an outlet duct 63 in casing 55.

Engine 50 is shown in FIG. 2B as a jet engine wherein the energy remaining in the combustion gases after leaving the turbine is converted into thrust. It should, however, be understood that the control system of the present invention is equally applicable to an engine wherein the exhaust gases are ducted through a separate power turbine. The power turbine the converts the remaining energy of the combustion gases into mechanical energy which is transmitted by means of a rotating shaft. Although the present invention applies to either type of engine, it will be described in detail in this specification in connection with a jet engine.

Shaft 54 is connected to speed sensing apparatus 70 by means of an accessory drive shaft 71. It should be understood that it may be necessary for shaft 71 to operate at a slower speed than shaft 54. Accordingly, there may be a suitable gear reducer (not shown) between shaft 54 and shaft 71. In any case, the speed of shaft 71 is a measure of the speed of compressor 52. Speed-sensing apparatus 70 includes an analog fluidic speed sensor 72 and a digital fluidic speed sensor 73. Analog speed sensor 72 produces an analog engine speed output signal in the form of a fluid pressure differential in conduits 74 and 75. Analog speed sensor 72 may be of any suitable type. One such suitable device is disclosed in U.S. Pat. No. 3,363,453 filed Dec. 12, 1966 in the name of Donald J. Erickson and assigned to the assignee of the present application.

Conduits 74 and 75 connect analog speed sensor 72 to a proportional fluid amplifier 80. Amplifier 80 is only one of a number of proportional fluid amplifiers included in the system of FIGS. 2A and 2B. Each of these proportional fluid amplifiers is symbolically represented by an amplifier symbol having a circle at its center. The system of FIGS. 2A and 2B also includes a number of bistable fluid amplifiers, each of which is symbolically represented by an amplifier symbol without a circle at its center. Each of the proportional and bistable fluid amplifiers has a power nozzle indicated by a reference character "a." The power nozzles of most of the amplifiers are connected to be continuously supplied with fluid from a fluid source 81 which is also common to other elements in this system. Each of the proportional and bistable fluid amplifiers in the system of FIGS. 2A and 2B also includes a pair of opposing control ports indicated by reference characters "b" and "c" and a pair of outlet passages indicated by reference characters "d" and "e." In addition, certain of the proportional and bistable fluid amplifiers also include an additional pair of opposing control ports indicated by the reference characters "f" and "g." Reference hereinafter to a particular element of a fluid amplifier will be made by amplifier identification number and reference character of the particular element. For example, control port "b" of amplifier 80 will be referred to as "control port 80b." It should be understood that even though a single amplifier such as amplifier 80 is shown at various points in FIGS. 2A and 2B, a cascade of such amplifiers may equally as well be used where this appears to be desirable.

Each of the proportional and bistable fluid amplifiers operates such that when power nozzle "a" is supplied with fluid under pressure, it is caused to issue a fluid stream which is received by outlet passages "d" and "e." In the proportional amplifiers, the fluid stream issuing from power nozzle "a" may be received in varying proportions in both outlet passages "d" and "e," depending on the pressure differential existing between opposing control ports. In the bistable amplifiers, a fluid stream issuing from power nozzle "a" is received in either outlet passage "d" or outlet passage "e," depending on which of the opposing control ports is supplied with the higher pressure. In each of the proportional and bistable fluid amplifiers, a pressure in control port "b" which is greater than the pressure in control port "c" will tend to cause the fluid stream issuing from power nozzle "a" to emerge from outlet passage "e." Similarly, in those amplifiers having a second pair of control ports, a pressure in control port "f" which is greater than the pressure in control port "g" will tend to cause a fluid stream issuing from power nozzle "a" to emerge from outlet passage "e." Conversely, a pressure in control port "c" which is greater than the pressure in control port "b" will tend to cause an output from outlet passage "d." A pressure in control port "g" which is greater than the pressure in control port "f" will also tend to cause an output from outlet passage "d."

Control ports 80b and 80c, which are connected to analog speed sensor 72, are also connected to a bias circuit 82 which is supplied with fluid from fluid source 81. Bias circuit 82 supplies fluid to control port 80b through an orifice 83 and to control port 80c through a variable orifice 84. The output of amplifier 80 appears as a fluid pressure differential between outlet passages 80d and 80e. The fluid pressure in outlet passage 80e may be either smaller or greater than the fluid pressure in outlet passage 80d depending on the setting of bias arrangement 82.

Engine 50 always runs in the same direction, therefore, the pressure differential output signal from analog speed sensor 72 always has the same sense. It has a value of zero when shaft 54 is motionless and a maximum value when shaft 54 reaches its maximum speed. The function of bias arrangement 82 is to modify the fluid signals reaching control ports 80b and 80c such that they are equal for some predetermined speed of shaft 54 between zero and its maximum value. The pressure signal at control port 80b thereby exceeds that at control port 80c for a shaft speed greater than the predetermined value. Conversely, the pressure at control port 80c exceeds that at control port 80b for a shaft speed less than the predetermined value. Thus, the operation of amplifier 80 throughout its entire linear operating range is provided.

Outlet passages 80d and 80e are connected to control ports 90f and 90g of a proportional fluid summing amplifier 90 by means of a pair of conduits 86 and 87. Conduits 86 and 87 also connect outlet passages 80d and 80e to a pair of speed signal conduits 88 and 89 which provide for distributing the speed signal from amplifier 80 to various other portions of control system 51.

Control ports 90b and 90c are connected to speed command means 95 by means of a pair of conduits 91 and 92. Speed command means 95 comprises a speed selector 96 and a fluid transducer 97. Selector 96 is connected to transducer 97 by means of a connecting link 98 whereby movement of selector 96 is transmitted to transducer 97. Transducer 97 may be of any suitable type wherein mechanical motion is converted into a fluid pressure differential signal. One such device is disclosed in the copending application of Jeffrey M. Lazar, Ser. No. 664,487, now U.S. Pat. No. 3,504,698 filed Aug. 30, 1967 and assigned to the assignee of the present application. Transducer 97 is adapted to be supplied with fluid from source 81 and operates to produce a pressure differential between a pair of conduits 99 and 100 indicative of the position of selector 96. Conduits 99 and 100 are connected to control ports 105f and 105g of a proportional fluid summing amplifier 105. Amplifier 105 also includes a pair of control ports 105b and 105c which are connected to other command sources 106 by means of a pair of conduits 107 and 108. Other command source 106 provides pressure differential speed command signals in response to conditions not directly under the operator's control.

The output signals from speed command means 95 are produced at outlet passages 105d and 105e which are connected to control ports 90b and 90c by means of conduits 91 and 92. The output signal from amplifier 90 is a speed error signal which is indicative of the difference between the actual engine speed and a commanded engine speed. The speed error signal takes the form of a fluid pressure differential between outlet passages 90d and 90e. It should, however, be noted that the production of a speed error signal is dependent on fluid being supplied to power nozzle 90a. Power nozzle 90a is connected to a fluid supply circuit 350 which supplies fluid only under certain conditions as will hereinafter be described.

Elements 72 through 108 comprise speed signal means 110. In addition to speed signal means 110, control system 51 also includes stall signal means 111 and temperature limit signal means 112. Stall signal means 111 and temperature limit signal means 112 together comprise temperature signal means.

Stall signal means 111 includes digital speed sensor 73 and temperature sensing means 113. Digital speed sensor 73 may be of any suitable type which produces an output signal comprising a train of fluid pressure pulses having a repetition rate indicative of the speed being sensed. For example, digital speed sensor 73 may include a disk interrupter having a mutually aligned fluid emitter and fluid receiver positioned on opposite sides of an apertured disk which is adapted to rotate therebetween and which is driven by means of shaft 71. The output of the disk interrupter is, then, a train of fluid pressure pulses having a repetition rate which is proportional to the speed of shaft 54.

The pressure pulse train from digital speed sensor 73 is supplied to a pair of control ports 115b and 115c of a monostable fluid amplifier 115 by means of a conduit 116, a short control passage 117 and a longer control passage 118. Passage 118 is exposed to the air entering compressor 52, thereby causing the fluid therein to have essentially the same temperature as the air entering the compressor. Amplifier 115 is shown as being monostabled by virtue of a biasing arrangement 119 which functions to cause the output from amplifier 115 to normally be from outlet passage 115d. Outlet passage 115d is connected to a capacitance tank 120 through an orifice 121. Outlet passage 115e is connected to a capacitance tank 122 through an orifice 123. Orifices 121 and 123 and capacitance tanks 120 and 122 function to integrate the pressure pulse trains supplied thereto from amplifier 115. An analog pressure differential signal is produced between the outlets of capacitance tanks 120 and 122, the magnitude of which is representative of the function $N/\sqrt{\theta}$, the corrected speed of engine 50. Digital speed sensor 73 and elements 115 through 123 comprise a corrected speed sensor of the type disclosed in the copending application of Jerome L. Johnson, Ser. No. 623,663, now U.S. Pat. No. 3,502,094 filed Mar. 16, 1967 and assigned to the assignee of the present application. A more detailed discussion of the corrected speed sensor is contained in the above-referenced application. It should, however, be noted that any suitable monostable amplifier arrangement may be substituted for amplifier 115 and biasing arrangement 119. Such an amplifier arrangement need not have the exact configuration shown in FIG. 2B.

The outlets of capacitance tanks 120 and 122 are connected to a pair of control ports 125f and 125g of a proportional fluid summing amplifier 125. Amplifier 125 also includes a pair of control ports 125b and 125c which are connected to variable biasing means 126 and 127. Variable biasing means 126 and 127 function to cause amplifier 125 to have certain required gain characteristics. With biasing means 126 and 127 properly adjusted, the gain characteristics of amplifier 125 are such that it converts the signal from capacitance tanks 120 and 122 into an analog pressure differential signal indicative of incipient stall temperature. This signal is produced between outlet passages 125*d* and 125*e* which are connected to a pair of control ports 130*f* and 130*g* of a proportional fluid summing amplifier 130.

The engine temperature at the inlet to turbine 53 is sensed by temperature sensing means 113 which includes fluidic temperature sensors 135 and 136 which are supplied with combustion gases from combustion chamber 57 by means of conduits 137 and 138 respectively. Although temperature sensors 135 and 136 are shown as being external to engine 50, they may equally well be located within the engine, in which case conduits 137 and 138 may be eliminated. Temperature sensors 135 and 136 are of the fluid oscillator type which produces an oscillating output signal having a frequency indicative of the temperature of the fluid therewithin. One such device is disclosed in the copending application of Edward G. Zoerb, Ser. No. 469,972, filed June 30, 1965 and assigned to the assignee of the present application. The geometry of temperature sensor 135 is slightly different than the geometry of temperature sensor 136. Accordingly, for any given engine temperature, temperature sensors 135 and 136 produce signals which oscillate at different frequencies.

The output signals from temperature sensors 135 and 136 are supplied to fluid couplers 140 and 141. Fluid couplers 140 and 141 function to separate the oscillating signals containing temperature information from the hot combustion gases as discussed in application Ser. No. 469,972. The combustion gases are thereafter vented from the system. The oscillating fluid temperature signals from coupling elements 140 and 141 are supplied to control ports 145*b* and 145*c* of a bistable fluid amplifier 145. Amplifier 145 functions to produce an output signal in each of its outlet passages 145*d* and 145*e* which is a square wave pulse train, the repetition rate of which is equal to the difference in frequencies of the output signals from temperature sensors 135 and 136. The repetition rate of the output signals from outlet passages 145*d* and 145*e* is, thus, indicative of the turbine inlet temperature in engine 50.

Outlet passage 145*d* is connected to a corrected temperature computer 150 by means of a conduit 146. Corrected temperature computer 150 comprises a monostable fluid amplifier 151 having a pair of control ports 151*b* and 151*c*. Control ports 151*b* and 151*c* are connected to conduit 146 by means of a short control passage 152 and a longer control passage 153 respectively. Passage 153 is exposed to the air entering compressor 52 thereby causing the fluid therein to have essentially the same temperature as the air entering the compressor. Amplifier 151 is shown as being monostable by virtue of a biasing arrangement 154 which functions to cause the output from amplifier 151 to normally be from outlet passage 151*d*. Outlet passage 151*d* is connected to a capacitance tank 156 through an orifice 157. Outlet passage 151*e* is connected to a capacitance tank 158 through an orifice 159. It should be noted that any suitable monostable amplifier arrangement may be substituted for amplifier 151 and biasing arrangement 154.

Corrected temperature computer 150 functions such that a given pressure pulse in the pressure pulse train supplied thereto from outlet passage 145*d* will enter control ports 151*b* first in time and override the bias signal at control port 151*g*, thereby switching the output of amplifier 151 to outlet passage 151*e*. At some later time, dependent on the temperature of the air to which conduit 153 is exposed, the same pressure pulse will enter control port 151*c*, thereby causing the output of amplifier 151 to be switched back to outlet passage 151*d*. The output signals produced in outlet passages 151*d* and 151*e* are pressure pulse trains having the same repetition rate as the pressure pulse train supplied to amplifier 151 from amplifier 145 and having pulse durations dependent on the temperature of the air to which passage 153 is exposed. Orifices 157 and 159 and capacitance tanks 156 and 158 serve to integrate the pressure pulses transmitted thereinto and produce an analog pressure differential output signal. The magnitude of the pressure differential produced between capacitance tanks 156 and 158 is directly proportional to the square root of the turbine inlet temperature and inversely proportional to the square root of $\theta$, and represents the corrected turbine inlet temperature, $\sqrt{T/\theta}$. The outlets of capacitance tanks 156 and 158 are connected to a pair of control ports 130*b* and 130*c* of amplifier 130.

Elements 73 and 116 through 158 comprise stall signal means 111. The pressure differential output signal produced between outlet passages 130*d* and 130*e* is a stall error signal which is indicative of the difference between the corrected turbine inlet temperature and the incipient stall temperature. Outlet passages 130*d* and 130*e* are connected to a first signal input 181 of a mode selector circuit 180. Mode selector circuit 180 also has a second signal input 182 to which a temperature limit error signal is supplied as will hereinafter be described and a signal output 183.

Outlet passage 145*e* of amplifier 145 is connected to temperature limit signal means 112 by means of a conduit 249. More specifically, outlet passage 145*e* is connected to a signal input 247 of an actual temperature computer 250 having a signal output 248. Actual temperature computer 250 comprises a device having a number of features identical to those of corrected temperature computer 150. Actual temperature computer 250 includes a monostable fluid amplifier having a pair of control ports connected to conduit 249 through control passages of different lengths. The relationship of the shorter and longer control passages to the amplifier is the same as that described for corrected temperature computer 150. The longer control passage is, however, provided with a slideable trombone section, and the length of the longer control passage is determined by means of a temperature sensitive bimetallic element.

Both the longer control passage and the bimetallic element are exposed to the air entering the compressor. Accordingly the length of the longer control passage is determined by the temperature of the air entering the compressor. Further, the bimetallic element operates to vary the length of the longer control passage with temperature directly as the acoustic velocity of the signals within the passage vary with temperature.

In operation, a given pulse in the pressure pulse train supplied by conduit 249 enters the control port to which the shorter control passage is connected first in time. At some later time, independent of temperature due to the counteracting effects of temperature on the length of the longer passage and the acoustic velocity of the signals therein, the same pressure pulse enters the control port to which the longer control passage is connected. The output signal of the monostable amplifier is thereby switched to the nonpreferred outlet passage for a fixed length of time for each pressure pulse that is supplied by conduit 249. Accordingly, pulse trains having fixed pulse durations and having repetition rates equal to the repetition rate of the signal in conduit 249 are produced at each of the outlet passages of the amplifier.

Each of the outlet passages of the monostable amplifier is connected to a capacitance tank through an orifice. The capacitance tank and orifice serve to integrate the pressure pulses transmitted thereinto and produce an analog pressure output signal. The magnitude of the pressure differential produced between the capacitance tanks is proportional to the actual turbine inlet temperature within engine 50.

Actual temperature computer 250 comprises a device of the type disclosed in the copending application of Roger A. Rausch, Ser. No. 707,790, now U.S. Pat. No. 3,529,612 filed Feb. 23, 1968 and assigned to the assignee of the present application. A more detailed discussion of the actual temperature computer is contained in the above-referenced application.

Output 248 of actual temperature computer 250 is connected to a pair of control ports 275*f* and 275*g* of a proportional fluid summing amplifier 275 which also includes a pair of control ports 275*b* and 275*c*. Control port 275*b* is connected to fluid source 81 through a variable orifice 276. Amplifier 275 and orifice 276 comprise temperature limit signal means 112. Outlet passages 275d and 275e, which supply the output signal of temperature limit signal means 112, are connected to second signal input 182 to mode selector circuit 180.

Figure 3:
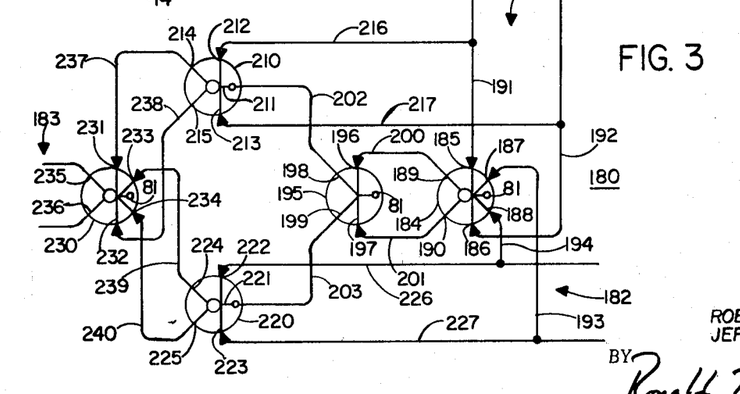
FIG. 3 is a schematic representation of a fluidic mode selection circuit suitable for use in the control system of FIGS. 2A and 2B.

Mode selector circuit 180 can best be described by reference to FIG. 3 wherein it is shown in detail. Mode selector circuit 180 comprises a proportional fluid summing amplifier 184 having a power nozzle connected to fluid source 81, a first pair of opposing control ports 185 and 186, a second pair of opposing control ports 187 and 188, and a pair of outlet passages 189 and 190. Control ports 185 and 186 are connected to first signal input 181 by means of a pair of conduits 191 and 192. Control ports 187 and 188 are connected to second signal input 182 by means of a pair of conduits 193 and 194. Outlet passages 189 and 190 are connected to a pair of control ports 196 and 197 of a bistable fluid amplifier 195 by means of a pair of conduits 200 and 201. Amplifier 195 also includes a power nozzle which is connected to fluid source 81 and a pair of outlet passages 198 and 199.

Mode selector circuit 180 also includes a proportional fluid amplifier 210 and a proportional fluid amplifier 220. Amplifier 210 includes a power nozzle 211, a pair of opposing control ports 212 and 213, and a pair of outlet passages 214 and 215. Amplifier 220 includes a power nozzle 221, a pair of opposing control ports 222 and 223 and a pair of outlet passages 224 and 225. Power nozzles 211 and 221 are connected to outlet passages 198 and 199 of amplifier 195 by means of conduits 202 and 203. Amplifier 195 comprises a bistable fluid supply for amplifiers 210 and 220. Control ports 212 and 213 of amplifier 210 are connected to conduits 191 and 192 of signal input 181 by means of conduits 216 and 217. Control ports 222 and 223 of amplifier 220 are connected to conduits 194 and 193 of signal input 182 by means of conduits 226 and 227.

Mode selector circuit 180 further includes a proportional fluid summing amplifier 230 which includes a power nozzle connected to fluid source 81, a first pair of opposing control ports 231 and 232, a second pair of opposing control ports 233 and 234 and a pair of outlet passages 235 and 236. Control ports 231 and 232 are connected to outlet passages 214 and 215 by means of conduits 237 and 238. Control ports 233 and 234 are connected to outlet passages 224 and 225 by means of conduits 239 and 240. Outlet passages 235 and 236 comprise signal output 183 of mode selector circuit 180.

Mode selector circuit 180 functions to select the smallest of the signals supplied to signal inputs 181 and 182 and to provide only that signal at signal output 183. In describing the operation of circuit 180, assume that the signal supplied to signal input 181 is a fluid pressure differential between conduits 191 and 192 and that the pressure in conduit 192 exceeds the pressure in conduit 191. In control system 51, this input signal is the stall error signal produced between outlet passages 130d and 130e. Further, assume that the signal supplied to signal input 182 is a fluid pressure differential between conduits 193 and 194 and that the pressure in conduit 193 exceeds the pressure in conduit 194. In control circuit 51, the signal supplied to signal input 182 is the temperature limit error signal produced between outlet passages 275d and 275e. The stall error and temperature limit error signals are supplied to control ports 185 through 188 of amplifier 184. For the purpose of the following discussion, assume that the stall error signal supplied to signal input 181 is of a smaller magnitude than the temperature limit error signal supplied to signal input 182.

Amplifier 184 functions to sum the stall and temperature limit error signals and to provide an output indicative of the difference of magnitudes. Since the stall error signal is smaller than the temperature error signal, the pressure signal produced in outlet passage 190 will be greater than the pressure signal produced in outlet passage 189. The signals produced in outlet passages 189 and 190 are supplied to control ports 196 and 197 of amplifier 195. Since amplifier 195 is bistable, its entire output signal will be produced in either outlet passage 198 or outlet passage 199 depending on the sense of the pressure differential between control ports 196 and 197. Since the pressure supplied to control port 197 exceeds the pressure supplied to control port 196, a fluid output signal will be produced in outlet passage 198 and no signal will be produced in outlet passage 199. Outlet passages 198 and 199 are connected to power nozzles 211 and 221 of amplifiers 210 and 220. Since the output from amplifier 195 is from outlet passage 198, power nozzle 211 is supplied with fluid and no fluid is supplied to power nozzle 221.

The stall error and temperature limit error signals which are supplied to signal inputs 181 and 182 are also transmitted to the control ports of amplifiers 210 and 220. Since power nozzle 211 is supplied with fluid, amplifier 210 is operable to transmit the signal supplied to control ports 212 and 213. Further, since the pressure signal supplied to control port 213 from conduit 192 exceeds the pressure supplied to control port 212 from conduit 191, the pressure produced in outlet passage 214 exceeds the pressure produced in outlet passage 215. The output signal from amplifier 210 is supplied to control ports 231 and 232 of summing amplifier 230.

Since no fluid is supplied to power nozzle 221, amplifier 220 cannot transmit the signals supplied to control ports 222 and 223. Accordingly, no output signals are produced in outlet passages 224 and 225 and no signals are supplied to control ports 233 and 234 of amplifier 230. Amplifier 230 functions to sum the signals supplied to control ports 231 through 234. However, since no signals are supplied to control ports 233 or 234, the output signal produced in outlet passages 235 and 236 is representative of only the stall error signal supplied to signal input 181, which is the smallest of the input signals.

The signal path can similarly be traced for the case in which the temperature limit error signal supplied to signal input 182 is smaller than the stall error signal supplied to signal input 181. Under that condition, it will be found that bistable amplifier 195 produces an output in outlet passage 199 and produces no output in outlet passage 198. Accordingly, power nozzle 221 of amplifier 220 is supplied with fluid and power nozzle 211 of amplifier 210 is not supplied with fluid. The result is that only the temperature limit error signal is transmitted to amplifier 230. The output signal produced by amplifier 230 is, thus, representative of only the temperature limit error signal supplied to signal input 182.

Output 183 of mode selection circuit 180 is connected to a first signal input 281 of a mode selection circuit 280 by means of a pair of conduits 277 and 278. Mode selection circuit 280 is similar to mode selection circuit 180 and includes a second signal input 282 and a signal output 283. Signal input 282 is connected to outlet passages 90d and 90e of amplifier 90.

Mode selection circuit 280 operates in the same manner as mode selection circuit 180 and produces a signal at signal output 283 in response to only the smallest of the signals supplied to signal inputs 281 and 282. Since the signal supplied to signal input 281 is a temperature error signal and the signal supplied to signal input 282 is a speed error signal, the signal produced at output 283 is the smallest of the temperature and speed error signals. Further, since the temperature error signal supplied to signal input 281 is, itself, the smallest of the stall error and temperature limit error signals, the signal produced at output 283 is the smallest of the stall error, temperature limit error and speed error signals.

As noted hereinbefore, it may be necessary to select and transmit a signal indicative of only the middle one of three error signals to effect desired control. This is the case if, for example, it is desired to preclude engine speed or temperature from falling below predetermined minimum values so as to provide an optimum deceleration mode, allow proper operation of speed sensitive engine accessories, and/or prevent flame-out.

Figure 4:
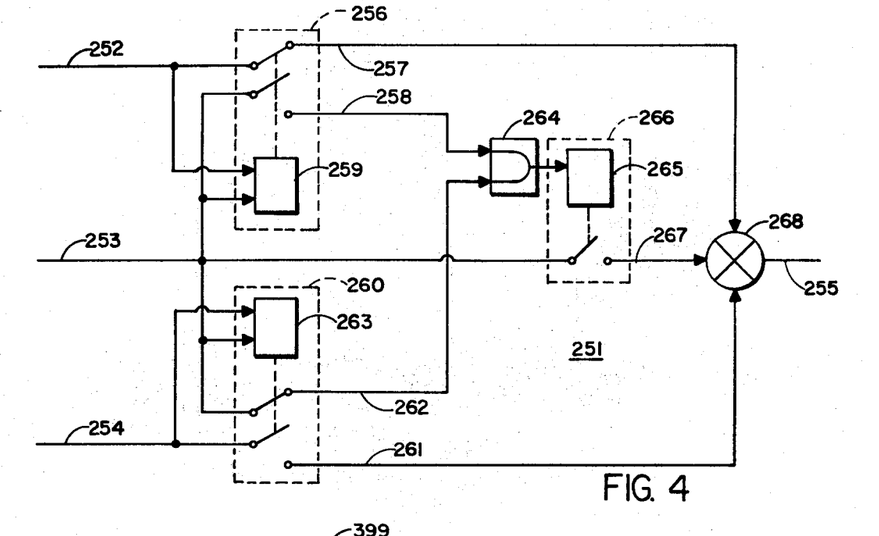
FIG. 4 is a block diagram of a median signal selector suitable for use in the control system of FIGS. 2A and 2B as a substitute for the fluidic mode selection circuit of FIG. 3.

A control system having the above-stated capabilities can be provided by including additional signal means for providing signals indicative of minimum speed and temperature error and replacing mode selector circuits 180 and 280 with median signal selectors. FIG. 4 is a functional representation of a simplified median signal selector having the capabilities required for a control system in which median signal selection is used. It will be noted that this selector is limited to use with input signal combinations wherein all of the input signals have nonzero values and no two signals are equal. Further, signal at input 252 must be greater than the signal at input 254. These input signal conditions can, however, easily be met by proper design of the signal means which produce the input signals.

Referring now to FIG. 4, the median signal selector is generally identified by reference numeral 251. Median signal selector 251 includes first, second, and third signal inputs 252, 253 and 254 and a signal output 255. Signal inputs 252 and 253 are connected to supply signals to a first switching means 256. Switching means 258 includes first and second output terminals 257 and 258 and an actuator 259. Actuator 259 functions to connect signal input 252 to output terminal 257 if the signal at input 252 is smaller than the signal at input 253. Similarly, if the signal at input 253 is smaller than the signal at input 252, input 253 is connected to output terminal 258.

Signal inputs 253 and 254 are connected to a second switching means 260. Switching means 260 includes first and second output terminals 261 and 262 and an actuator 263. Actuator 263 functions to connect input 253 to output terminal 262 if the signal at input 253 is larger than the signal at input 254. Similarly, if the signal at input 254 is larger than the signal at input 253, input 254 is connected to output terminal 261. Output terminals 258 and 262 are connected to a pair of inputs to an AND-device 264. AND-device 264 produces an output signal only if signals are simultaneously supplied to both inputs from output terminals 258 and 262.

The output of AND-device 264 is connected to an actuator 265 which comprises a portion of switching means 266. Switching means 266 is connected to signal input 253 and includes an output terminal 267. Actuator 265 functions to connect input 253 to output terminal 267 only when it is receiving a signal from an AND-device 264. Output terminals 257, 261, and 267 are connected to summing means 268. Summing means 268 functions to provide a signal at output 255 indicative of the signals received from output terminals 257, 261, and 267.

For purposes of describing the operation of median signal selector 251, assume that signals are supplied to signal inputs 252, 253 and 254 such that the signal at input 252 is larger than the signal at input 253 and that the signal at input 253 is larger than the signal at input 254. The signals at inputs 252 and 253 are supplied to switching means 256 and cause actuator means 259 to connect input 253 to output terminal 258 and disconnect input 252 from output terminal 257. Accordingly, the signal at input 253 is transmitted to one input of AND-device 264. No signal is transmitted from input 252 to summing means 268.

The signals at inputs 253 and 254 are transmitted to switching means 260 and cause actuator 263 to connect input 253 to output terminal 262 and disconnect input 254 from output terminal 261. Accordingly, the signal at input 253 is transmitted to the second input to AND-device 264. No signal is transmitted from input 254 to summing means 268. Since signals are present at both inputs to AND-device 264, a signal is transmitted therefrom to actuator 265. Actuator 265, thus, causes input 253 to be connected to output terminal 267. The signal at input 253 is, therefore, transmitted to summing means 268. Since the signal at input 253 is the only signal transmitted to summing means 268, the signal produced at signal output 255 is the signal supplied to input 253. This signal is the median input signal.

Now assume that the signal at input 252 is the largest signal, and that the signal at input 254 is larger than the signal at input 253. Thus, the signal at input 254 is the median input signal. Since the signal at input 252 is larger than the signal at input 253, actuator 259 functions to connect input 253 to output terminal 258 and disconnect input 252 from output terminal 257. Thus, the signal at input 253 is supplied to one input to AND-device 264 and no signal is supplied from input 252 to summing means 268. Since the signal at input 254 is larger than the signal at input 253, actuator 263 functions to connect input 254 to output terminal 261 and disconnect input 253 from output terminal 262. Thus, no signal is supplied to the second input to AND-device 264. The signal at input 254 is transmitted to summing means 268. Since only one of the inputs to AND-device 264 is supplied with a signal, it produces no output signal. Accordingly, input 253 is not connected to output terminal 267 and no signal is transmitted therefrom to summing means 268. The signal at signal output 255 thus comprises only the signal supplied to input 254 which is the median input signal.

By similar analysis, it can be determined that if the signal supplied to input 253 is larger than the signal supplied to input 252, and if the signal supplied to input 254 is smaller than the signal supplied to 252, only the signal supplied to input 252 will be transmitted to summing means 268. Thus, it is clear that median signal selector 251 selects and transmits only the median one of the three input signals supplied thereto. It is also apparent that median signal selectors such as median signal selector 251 can be utilized as replacements for mode selectors 180 and 280 in the control system of FIGS. 2A and 2B. This results in a control system in which an independent operating variable is controlled in response to a median signal which is indicative of the most critical operating parameter.

Returning now to the control system embodiment shown in FIGS. 2A and 2B, output 283 of mode selection circuit 280 is connected to an input 291 to a fluidic variable gain circuit 290 which also includes a gain control port 292 and an output 293. Variable gain circuit 290 may be of any suitable type wherein gain changes are accomplished by means of a fluid gain control signal supplied thereto. One such suitable device is disclosed in the copending application of Charles W. Rainer, Ser. No. 659,964, now U.S. Pat. No. 3,499,460, filed Aug. 11, 1967 and assigned to the assignee of the present application. For the purpose of this specification, reference numeral 290 will refer to the variable gain circuit of application Ser. No. 659,964 which contains a complete description of the circuit.

Variable gain circuit 290 functions such that its gain increases as the pressure supplied to gain control port 292 decreases. Gain control port 292 is connected to an outlet passage 295e of a proportional amplifier 295. Control ports 295b and 295c of amplifier 295 are connected to outlet passages 125e and 125d of amplifier 125 by means of a pair of conduits 296 and 297. Outlet passage 295d is vented through an orifice 298 which is sized to furnish a load substantially equal to the load furnished at outlet passage 295e by variable gain circuit 290.

The signal supplied to amplifier 295 from amplifier 125 is the corrected speed signal. This signal varies such that as the corrected speed increases, the pressure produced at outlet passage 125d increases with respect to the pressure produced at outlet passage 125e. This pressure differential is transmitted to control ports 295c and 295b and causes the pressure supplied to gain control port 292 from outlet passage 295e to decrease as the corrected speed increases. The result is that the gain of variable gain circuit 290 increases as the corrected speed increases.

Output 293 of variable gain circuit 290 is connected to a pair of control ports 300f and 300g of a proportional summing amplifier 300. Amplifier 300 also has a pair of control ports 300b and 300c which are connected to speed signal conduits 88 and 89 by means of a pair of conduits 301 and 302 and a high pass fluid circuit 303.

High pass circuit 303 comprises a proportional fluid amplifier 305 having a power nozzle 305a connected to fluid source 81, a first pair of opposing control ports 305b and 305c, a second pair of opposing control ports 305f and 305g and a pair of outlet passages 305d and 305e. Control port 305b is connected to conduit 301 through an orifice 306 and a capacitance tank 307 in series therewith. Control port 305c is connected to conduit 302 through an orifice 308 and a capacitance tank 309 in series therewith. Control ports 305f and 305g are connected to conduits 302 and 301 respectively through orifices 310 and 311. Outlet passages 305d and 305e are connected to control ports 300c and 300b.

High pass circuit 303 supplies a pressure differential signal to amplifier 300 only when the actual engine speed is changing. When the engine speed is constant, the signal supplied to control port 305b through orifice 306 and capacitance tank 307 and the signal supplied to control port 305g through orifice 311 have equal and opposite effects on the stream issuing from power nozzle 305a. Likewise, when the engine speed is constant, the signal supplied to control port 305c through orifice 308 and capacitance tank 309 and the signal supplied to control port 305f through orifice 310 have equal and opposite effects on the stream issuing from power nozzle 305a. Accordingly, the effects of the signals supplied to control ports 305b, 305c, 305f and 305g are self-cancelling and the stream issuing from power nozzle 305a is evenly divided between outlet passages 305d and 305e.

Now assume that the actual engine speed is changing. Further assume that the engine speed is increasing, thus causing the pressure in speed signal conduit 89 to increase with respect to the pressure in speed signal conduit 88. The increasing pressure is transmitted substantially instantaneously to control port 305f through conduit 302 and orifice 310. However, due to the volume of capacitance tank 309, the change in pressure in conduit 302 is delayed in reaching control port 305c. Similarly, the decreasing pressure in speed signal conduit 88 is transmitted substantially instantaneously to control port 305g through conduit 301 and orifice 311. Due to the volume of capacitance tank 307, the change in pressure in conduit 301 is delayed in reaching control port 305b. The result is that an increasing pressure is supplied substantially instantaneously to control port 305f and a decreasing pressure is supplied substantially instantaneously to control port 305g. This causes the signal produced in outlet passage 305e to be greater than the signal produced in outlet passage 305d. However, this result is only temporary. As soon as the actual engine speed has stabilized, the pressures in capacitance tanks 307 and 309 also stabilize at the pressures existing in conduits 301 and 302 respectively. Further, the effects of the signal supplied to control ports 305b and 305g and the signal supplied to control ports 305c and 305f once again become equal.

In a similar manner, if the actual engine speed is decreasing, thus causing the pressure in speed signal conduit 88 to increase with respect to the pressure signal and speed signal conduit 89, the pressure signal produced in outlet passage 305d will be greater than the pressure signal produced in outlet passage 305e.

Amplifier 300 functions to sum the signals supplied thereto from variable gain circuit 290 and high pass circuit 303. It should, however, be noted that during steady state operation, when the actual engine speed is not changing, the pressure differential signal produced between outlet passages 300d and 300e will be dependent only upon the signal supplied to amplifier 300 from variable gain circuit 290. The signal from high pass circuit 303 will have no effect on the output signal produced by amplifier 300 unless the actual engine speed is changing.

Certain of the elements described in the preceding paragraphs cooperate to form a variable lead circuit which is useful in a variety of control system applications. These elements include the signal path formed by conduits 86 and 87, amplifier 90 and mode selector 280. Also included are variable gain circuit 290 and associated gain control circuitry, conduits 301 and 302, high pass circuit 303 and summing amplifier 300.

In the present control system embodiment, the variable lead circuit is used to provide optimum engine speed control by compensating for the transient speed versus fuel control signal characteristic of the engine. It is however, apparent that this circuit can be used in connection with other operating parameters. It is also apparent that this circuit has utility in any system in which the transient response of apparatus being controlled is not a linear function of the control input.

Outlet passages 300d and 300e are connected to a pair of control ports 315f and 315g of a proportional fluid summing amplifier 315. Amplifier 315 also has a pair of control ports 315b and 315c which are connected to a start control circuit 320. Start control circuit 320 comprises an air pressure compensation circuit 321, a variable gain circuit 330 and a proportional fluid amplifier 340.

Air pressure compensation circuit 321 comprises a proportional fluid amplifier 322 having a power nozzle connected to fluid source 81, a first pair of opposing control ports 322f and 322g and a second pair of opposing control ports 322b and 322c. Control ports 322f and 322g are connected to speed signal conduits 89 and 88. Control ports 322b and 322c are connected to fluid source 81 through orifices 323 and 324. In addition, control port 322b is vented to the air at the engine inlet through an orifice 325. Orifices 323, 324 and 325 are sized such that for a predetermined normal engine inlet pressure, equal pressure signals are supplied to control ports 322b and 322c. However, if the actual engine inlet pressure falls below the predetermined normal pressure, the pressure supplied to control port 322b decreases with respect to the pressure supplied to control port 322c. Conversely, if the actual pressure increases above the predetermined normal pressure, the pressure supplied to control port 322b increases with respect to the pressure supplied to control port 322c. The function of orifices 323 and 324 is to provide a nonvarying reference pressure against which the engine inlet pressure can be compared. Orifice 324 cannot be used alone to perform this function since the pressure provided by fluid source 81 is subject to variation. Accordingly, the signal supplied through orifice 323 is utilized to compensate for and cancel out the effects of any variations in pressure from fluid source 81.

Amplifier 322 functions to sum the speed signal from speed signal conduits 88 and 89 with a signal indicative of the engine inlet pressure. It should be noted that under conditions of normal engine inlet pressure, the signal indicative thereof has no effect on the speed signal from speed signal conduits 88 and 89. Thus, for conditions of normal engine inlet pressure, the pressure differential signal produced between outlet passages 322d and 322e is dependent only on the speed signal supplied to amplifier 322. However, if the engine inlet pressure increases, the pressure produced in outlet passage 322e increases over what it would otherwise be and the pressure produced in outlet passage 322d decreases from what it would otherwise be. Conversely, if the engine inlet pressure decreases, the pressure produced in outlet passage 322e decreases from what it would otherwise be and the pressure produced in outlet passage 322d increases over what it would otherwise be.

Outlet passages 322d and 322e are connected to an input 331 to variable gain circuit 330 which also includes a gain control port 332 and an output 333. Variable gain circuit 330 is similar to variable gain circuit 290. The comments previously made in connection with variable gain circuit 290 also applied to variable gain circuit 330. It should, however, be noted that gain changes are accomplished by means of a fluid pressure signal supplied to gain control port 332. It should also be noted that as the pressure supplied to gain control port 332 increases, the gain of variable gain circuit 330 decreases. Conversely, as the pressure supplied to gain control port 332 decreases, the gain of variable gain circuit 330 increases.

The gain control signal is supplied to gain control port 332 from speed signal conduits 88 and 89 through a proportional fluid amplifier 335 and a bistable fluid amplifier 338 as follows. Amplifier 335 includes a pair control ports 335f and 335g which are connected to speed signal conduits 89 and 88. Amplifier 335 also includes a pair of control ports 335b and 335c. Control port 335c is connected to fluid source 81 through a variable orifice 336. Outlet passages 335d and 335e are connected to control ports 338b and 338c of amplifier 338. Outlet passage 338e is connected to gain control port 332. Outlet passage 338d is vented through an orifice 339 which is sized to furnish a load substantially equal to the load furnished at outlet passage 338e by variable gain circuit 330.

Since amplifier 338 is bistable, its entire output will be from either outlet passage 338d or 338e. Since outlet passage 338e is connected to control port 332, variable gain circuit 330 will have one of two possible gains depending on whether or not a signal is being produced in outlet passage 338e. If the output from amplifier 338 is from outlet passage 338e, variable gain circuit 330 will have a low gain. Conversely, if there is no output from outlet passage 338e, variable gain circuit 330 will have a higher gain. The production of the signal in outlet passage 338e is conditioned on a pressure signal being supplied to control port 338b which is greater than the pressure signal supplied to control port 338c. The signal supplied to control ports 338b and 338c from amplifier 335 is dependent on the speed signal in speed signal conduits 88 and 89 and the setting of variable orifice 336.

Considering only the speed signal, it can be seen that for low engine speeds, the pressure produced in outlet passage 335d will be greater than the pressure produced in outlet passage 335e. As the engine increases, a speed is reached where the pressures in speed signal conduits 88 and 89 are equal. At this point, the pressures produced in outlet passages 335d and 335e will also be equal. Above this speed, the pressure produced in outlet passage 335e will be greater than the pressure produced in outlet passage 335d. Accordingly, for engine speeds which cause a pressure in speed signal conduit 89 which is less than the pressure in speed signal conduit 88, amplifier 338 will generally produce an output from outlet passage 338e. Conversely, for engine speeds which cause a pressure in speed control conduit 89 which is greater than the pressure in speed signal conduit 88, amplifier 338 will generally produce an output from outlet passage 338d. However, the engine speed at which amplifier 338 switches between outlet passages 338d and 338e can be varied by varying the bias signal supplied to control port 335c through variable orifice 336. Accordingly, if it is desired to have amplifier 338 switch from outlet passage 338e to 338d at a higher engine speed, orifice 336 can be opened to provide a larger bias signal to control port 335c. Conversely, if orifice 336 is closed, the bias signal supplied to control port 335c is decreased and the output from amplifier 338 switches from outlet passage 338e to outlet passage 338d at a lower speed. From the above discussion, it can be seen that for engine speeds less than a predetermined speed, a pressure signal will be supplied to gain control port 332 and variable gain circuit 330 will have a low gain. As the engine speed increases beyond the predetermined speed, the pressure signal will be removed from gain control port 332 and the gain of variable gain circuit 330 will increase.

Variable gain circuit 330 and amplifiers 335 and 338 comprise a fluidic function generator. This fluidic function generator in cooperation with air pressure compensation circuit 321 comprises a fuel scheduling circuit. The fuel scheduling circuit functions to provide a fuel control signal which is indicative of the mass air flow into the engine. The fuel scheduling circuit additionally schedules fuel flow in response to engine speed.

Mass air flow into the engine is determined by engine speed which is indicative of the volumetric rate of air flow into the engine. A signal indicative of the volumetric air flow rate is then modified by a signal indicative of air pressure to provide a resultant signal at the output of amplifier 322 which is indicative of mass air flow into the engine. The air mass flow signal comprises the input signal to the function generator wherein it is modified in accordance with engine speed so as to provide optimum starting fuel flow control.

Output 333 of variable gain circuit 330 which also comprises the output of the fuel scheduling circuit, is connected to a pair of control ports 340f and 340g of amplifier 340. Amplifier 340 also includes a pair of control ports 340b and 340c which are connected to the output of a fluid transducer 345 by means of a pair of conduits 346 and 347. Fluid transducer 345 is similar to fluid transducer 97. The comments previously made in connection with fluid transducer 97 also apply to fluid transducer 345. Fluid transducer 345 is connected to fuel valve apparatus 400 by means of a connecting link 348. Fluid transducer 345 functions to sense the position of a metering element within fuel valve apparatus 400 and provide a pressure differential signal indicative thereof between conduits 346 and 347. As fuel valve 400 opens to allow greater fuel flow therethrough, the pressure produced in conduit 347 increases with respect to the pressure produced in conduit 346. Conversely, as fuel valve 400 closes to decrease the fuel flow therethrough, the pressure produced in conduit 346 increases with respect to the pressure produced in conduit 347.

Amplifier 340 functions to sum the signal from variable gain circuit 330 and the signal from fluid transducer 345 and produce a composite output signal indicative thereof in outlet passages 340d and 340e which are respectively connected to control ports 315c and 315b. The signal produced in outlet passages 340d and 340e is a pressure differential signal indicative of the proper setting of fuel valve 400 for starting engine 50. It should be noted that the production of the signal to provide the start setting for fuel valve 400 is dependent on fluid being supplied to power nozzle 340a. Power nozzle 340a is connected to fluid supply circuit 350 which supplies fluid thereto only under a start condition which is represented by an engine speed less than a predetermined speed.

Fluid supply circuit 350 comprises a proportional fluid amplifier 355 and a bistable fluid amplifier 360. Amplifier 355 includes a first pair of opposing control ports 355f and 355g which are connected to speed signal conduits 88 and 89. Amplifier 355 also includes a second pair of opposing control ports 355b and 355c. Control port 355b is connected to fluid source 81 through a variable orifice 356. Outlet passages 355d and 355e are connected to control ports 360b and 360c of amplifier 360. Outlet passage 360d is connected to power nozzle 340a by means of a conduit 361. Outlet passage 360e is connected to power nozzle 90a of amplifier 90 by means of a conduit 362.

The engine speed signal from speed signal conduits 88 and 89 is supplied to control ports 355f and 355g. For low engine speeds the pressure supplied to control port 355f exceeds the pressure supplied to control port 355g. For the speed at which the pressure signals in speed signal conduits 88 and 89 are equal, pressure signal supplied to control ports 355f and 355g will also be equal. At higher engine speeds, the pressure supplied to control port 355g exceeds the pressure supplied to control port 355f. Accordingly, for low engine speeds the pressure produced in outlet passage 355e exceeds the pressure signal produced in outlet passage 355d. At a predetermined engine speed, dependent on the setting of variable orifice 356, the pressure signals produced in outlet passages 355d and 355e are equal. For speeds higher than the predetermined speed, the pressure signal produced in outlet passage 355d exceeds the pressure signal produced in outlet passage 355e. Variable orifice 356 provides for varying the speed at which the pressures produced in outlet passages 355d and 355e are equal by furnishing means for varying the bias pressure supplied to control port 355b.

The output signal produced by amplifier 355 is supplied to control ports 360b and 360c. Amplifier 360 provides an output from outlet passage 360d when the pressure supplied to control port 360c exceeds the pressure supplied to control port 360b. Conversely, amplifier 360 provides an output from outlet passage 360e when the pressure supplied to control port 360b exceeds the pressure supplied to control port 360c. Since control port 360b is connected to outlet passage 355d and control port 360c is connected to outlet passage 355e, amplifier 360 provides an output from outlet passage 360d for engine speeds less than the predetermined speed and an output from outlet passage 360e for engine speeds greater than the predetermined speed.

Accordingly, power nozzle 340a is supplied with fluid only for engine speeds less than the predetermined speed and power nozzle 90a is supplied with fluid only for engine speeds greater than the predetermined speed. The result is that a starting fuel valve position signal is produced and no speed error signal is produced when an engine start condition is indicated. Conversely, when an engine run condition is indicated, no starting fuel valve position signal is produced and a speed error signal is produced.

Outlet passages 315d and 315e are connected to a pair of control ports 365f and 365g of a proportional fluid summing amplifier 365. Amplifier 365 also includes a pair of control ports 365b and 365c which are connected to conduits 346 and 347 through a high pass fluid circuit 370. High pass circuit 370 comprises a proportional fluid amplifier 371 having a power nozzle 371a connected to fluid source 81, a first pair of opposing control ports 371b and 371c, a second pair of opposing control ports 371f and 371g and a pair of outlet passages 371d and 371e. Control port 371b is connected to conduit 346 through an orifice 372 and a capacitance tank 373 in series therewith. Control port 371c is connected to conduit 347 through an orifice 374 and a capacitance tank 375 in series therewith. Control ports 371f and 371g are connected to conduits 347 and 346 respectively through orifices 376 and 377. Outlet passages 371d and 371e are connected to control ports 365c and 365b.

The operation of high pass circuit 370 is similar to the operation of high pass circuit 303 and need not be described in detail. High pass circuit 370 supplies a pressure differential signal to amplifier 365 only when the position of the metering element within fuel valve 400 is changing. Further, when the position of the metering element is changing to allow increased fuel flow, the pressure produced in outlet passage 371e exceeds the pressure produced in outlet passage 371d. Conversely, when the position of the metering element is changing to provide decreased fuel flow, the pressure produced in outlet passage 371d exceeds pressure produced in outlet passage 371e. If the metering element within fuel valve apparatus 400 is stationary at any position, no pressure differential signal is produced between outlet passages 371d and 371e.

The output signal from amplifier 371 is supplied to amplifier 365 where it is summed with signal received by amplifier 365 from amplifier 315. In steady state operation, the output signal produced between outlet passages 365d and 365e is dependent only on the signal received from amplifier 315. High pass fluid circuits 303 and 370 comprise a steady state anticipation circuit which functions, at times when the engine speed and/or position of the fuel valve metering element is changing, to anticipate the final engine speed and final fuel valve metering element position for steady state operation and prevent overshoot and oscillation of the engine speed and/or fuel valve metering element position about their steady state values.

Outlet passages 365d and 365e are connected to a control signal input 399 to fuel valve apparatus 400. Fuel valve apparatus 400 can best be understood by reference to FIG. 5 wherein it is illustrated in detail. Fuel valve apparatus 400 comprises a metering valve 405 and a fuel shutoff valve 406 which share a common housing 407. Metering valve 405 comprises a cylindrical chamber 408 within housing 407. A metering element 410 is slideably located within chamber 408. Metering element 410 comprises first, second and third lands 411, 412 and 413 which are connected and spaced apart by a connecting shaft 414. Lands 411, 412 and 413 are sized to fit snugly within chamber 408 and divide chamber 408 into subchambers 420, 421 and 422. Subchambers 420 and 422 are located on opposite ends of metering element 410. Subchambers 420 and 422 communicate with a pair of nozzles 425 and 426 by means of a pair of conduits 427 and 428. Nozzles 425 and 426 are mutually aligned and each is oriented toward the other, but separated therefrom. Fluid is supplied from a source 430 to conduits 427 and 428 through orifices 431 and 432. The fluid supplied from source 430 may be any suitable fluid. However, fuel is commonly used in this application.

Figure 5:
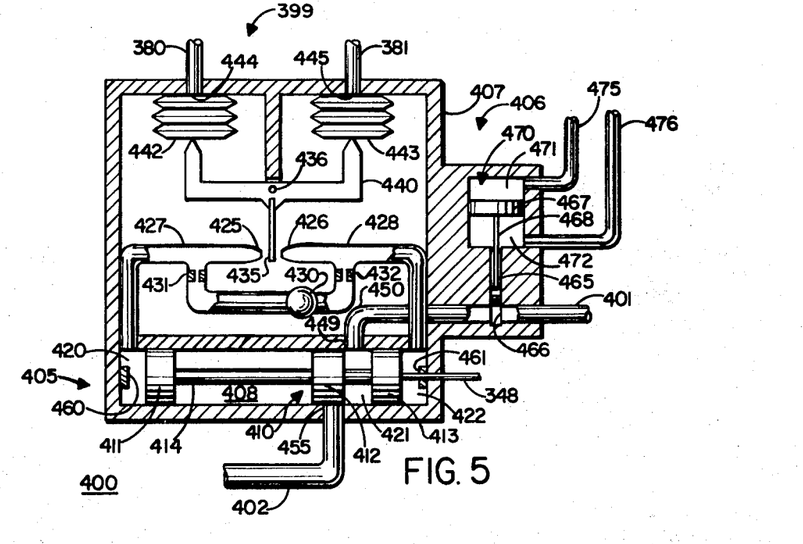
FIG. 5 is a sectional view of a fuel valve suitable for use in the control system of FIGS. 2A and 2B.

A flapper element 435 is mounted for movement between nozzles 425 and 426 in such a manner that is is normally centrally located between the nozzles, in which case fluid streams issuing from nozzles 425 and 426 are equally impeded. Element 435 is pivotally mounted at one end to housing 407 by means of a pivot 436. The center of a rocker mechanism 440 is affixed to the pivotally mounted end of element 435 and also pivots about pivot 436. The ends of rocker mechanism 440 are in contact with free ends of a pair of bellows 442 and 443, the fixed ends of which are attached to housing 407. Bellows 442 and 443 include pressure ports 444 and 445 which comprise pressure control signal input 399 to fuel valve apparatus 400. Pressure ports 444 and 445 are connected to outlet passages 365d and 365e by means of conduits 380 and 381.

Fuel is supplied to chamber 421 through a fuel inlet port 449 centrally located between lands 412 and 413 by means of a conduit 450. Fuel is supplied to conduit 450 through fuel shutoff valve 406 as will hereinafter be described. Subchamber 421 also includes a fuel outlet port 455, a variable portion of which is covered by land 412 as metering element 410 moves within chamber 408. Fuel outlet port 455 is connected to injectors 58 of engine 50 by means of fuel supply conduit 402.

Stops 460 and 461 are provided at opposite ends of chamber 408 to limit the travel of metering element 410 within chamber 408 and provide a maximum and minimum fuel flow limits through metering valve 405. Connecting link 348 which connects metering element 410 to fluid transducer 345 is attached to one end of metering element 410 and extends through an end wall of chamber 408.

As metering element 410 moves to the right, a greater portion of port 455 is covered by land 412 and fuel flow into fuel supply conduit 402 is decreased. Conversely, as fuel metering elements 410 moves to the left, a smaller portion of fuel outlet port 455 is covered by land 412 and fuel flow into conduit 402 is increased.

Fuel shutoff valve 406 is shown as comprising a gate valve which is actuated by a pneumatic piston. Fuel is supplied to the inlet side of valve 406 by means of fuel supply conduit 401. The outlet side of valve 406 is connected to fuel inlet port 449 by means of conduit 450. Valve 406 comprises a gate 465 which is slideably mounted in a guide 466 such that it can either block or permit flow from fuel supply conduit 401 to conduit 450. Gate 465 is connected to a pneumatic piston 467 by means of a connecting rod 468. Piston 467 is slideably mounted within a cylindrical chamber 470 and separates chamber 470 into two subchambers 471 and 472. Subchambers 471 and 472 communicate with a pair of conduits 475 and 476 which supply pneumatic fuel shutoff signals thereto as will hereinafter be described.

When fuel shutoff valve 406 is open fuel is permitted to flow from fuel supply conduit 401 into subchamber 421 through conduit 450. Fuel also flows from subchamber 421 to fuel supply conduit 402 at a rate dependent upon the position of metering element 410 within chamber 408. The position of metering element 410 is controlled by means of pneumatic signals supplied to control signal input 399 as follows. If no change in the fuel flow through fuel valve apparatus 400 is commanded, no pressure differential signal will be supplied to bellows 442 and 443 from conduits 380 and 381. Since the pressures supplied to bellows 442 and 443 are equal and the structure of flapper element 435 and rocker mechanism 440 is substantially symmetrical, element 435 will remain centered between nozzles 425 and 426 and will provide equal impedances to flow therefrom. The pressures in conduits 427 and 428 are, thus, equal and equal pressures will be supplied to subchambers 420 and 422. Accordingly, equal and opposite forces operate on metering element 410 and it remains stationary within chamber 408.

When an increase in fuel flow is commanded, the pressure supplied to conduit 380 is increased with respect to the pressure supplied to conduit 381. Accordingly, bellows 442 expands and bellows 443 contracts thus rotating rocker mechanism 440 in a counterclockwise manner about pivot 436. Flapper element 435 is thus displaced toward nozzle 426 and away from nozzle 425. This results in increased impedance to flow from nozzle 426 and decreased impedance to flow from nozzle 425. The result is that the pressure in conduit 428 and subchamber 422 increases with respect to the pressure in conduit 427 and subchamber 420. Metering element 410 is thereby induced to move to the left within chamber 408, thus increasing fuel flow to the engine.

Similarly, it can be seen that if a decreased fuel flow through fuel valve apparatus 400 is commanded, the pressure supplied to bellows 443 is increased with respect to the pressure supplied to bellows 442. Accordingly, rocker mechanism 440 and element 435 are rotated in a clockwise manner about pivot 436. Increased impedance to flow from nozzle 425 and decreased impedance to flow from nozzle 426 results and the pressure supplied to subchamber 420 is increased with respect to the pressure supplied to subchamber 422. Metering element 410 consequently moves to the right resulting in a corresponding decrease in fuel flow through fuel metering valve 405.

It will be noted that fuel valve apparatus 400 responds integrally to the control signals supplied thereto. That is, the change in position of metering element 410 in a given period of time is dependent on the integral of the control signals during that period of time. Thus, as long as the pressure in conduit 380 exceeds the pressure in conduit 381, metering element will continue to move to the left, increasing the fuel flow to the engine. Conversely, as long as the pressure in conduit 381 exceeds the pressure in conduit 380, metering element 410 will continue to move to the right, decreasing the fuel flow to the engine.

Fuel valve apparatus 400 is converted to proportional plus integral operation by providing a high passed negative feedback position signal through anticipator circuit 370. As previously pointed out, anticipator circuit 370 produces an output indicative of only the rate of change in metering element position. Thus, as the controlling error signal becomes small, indicating that the proper fuel flow is being approached, the high passed negative feedback signal becomes increasingly effective as it functions to reduce the rate of change in metering element position. Accordingly, as the fuel flow rate approaches a commanded value, its rate of change is decreased to prevent overshooting the commanded value.

It is pointed out that although the above-described proportional plus integral circuit has been described in connection with a fuel control device, it also has substantial utility in connection with actuators for controlling other variables. Many actuators for controlling a variety of variables respond integrally to control signals supplied thereto. A circuit as described above for providing a high passed negative feedback position signal can be used with any such actuator to allow it to respond rapidly while preventing it from overshooting a commanded value.

Subchambers 471 and 472 of fuel shutoff to fluid 406 are connected to a fuel shutoff logic circuit 480 by means of conduits 475 and 476. Fuel shutoff logic circuit 480 comprises a proportional fluid amplifier 485 and a bistable fluid amplifier 490 connected in series. Amplifier 485 includes a first pair of opposing control ports 485f and 485g which are connected to speed signal conduits 88 and 89. Amplifier 485 also includes a second pair of opposing control ports 485b and 485c. Control port 485b is connected to fluid source 81 through a variable orifice 487. Outlet passages 485d and 485e are connected to control ports 490b and 490c.

At low engine speeds, the pressure in speed signal conduit 88 exceeds the pressure in speed signal conduit 89. This pressure differential is supplied to control ports 485f and 485g and causes the pressure produced in outlet passage 485e to exceed the pressure produced in outlet passage 485d. As the engine speed increases, the pressure in speed signal conduit 89 increases with respect to the pressure in speed signal conduit 88. At some engine speed, the pressure in speed signal conduit 89 will increase sufficiently with respect to the pressure in speed signal conduit 88 to cause equal pressures to be produced in outlet passages 485d and 485e. The engine speed at which equal pressures are produced in outlet passages 485d and 485e may be varied by varying the bias pressure supplied to control port 485b. The bias pressure supplied to control port 485b may be varied by changing the setting of variable orifice 487. For low engine speeds which result in a greater pressure in outlet passage 485e than in outlet passage 485d, amplifier 490 will produce an output signal in only outlet passage 490d. This signal is transmitted to subchamber 471 of fuel shutoff valve 406 and positions gate 465 so as to block fuel flow therethrough. As the engine speed increases to a speed at which the pressure in outlet passage 485d becomes greater than the pressure in outlet passage 485e, the output from amplifier 490 switches from outlet passage 490d to outlet passage 490e. This output signal is transmitted to fuel shutoff valve 406 and causes valve 406 to open and permit fuel flow therethrough.

The operation of this system will now be apparent. In starting engine 50, fuel under pressure is provided to fuel supply conduit 401. Engine 50 is then cranked by external means whereby its speed is gradually increased. As the engine speed increases, air is supplied from fluid source 81 which may be a bleed on the discharge side of compressor 52 or other auxiliary means. Variable orifice 487 is set such that the output from amplifier 490 switches from outlet passage 490d to outlet passage 190e at 10 percent of full engine speed. Accordingly, when the engine speed reaches 10 percent of its maximum value, fuel shutoff valve 406 is caused to open, thus permitting fuel to flow from fuel supply conduit 401 through fuel metering valve 405 and into fuel supply conduit 402. Fuel is thus supplied to injectors 58 of engine 50 and engine ignition can be initiated.

Orifice 356 is set such that the output from amplifier 360 switches from output passage 360d to 360e at 45 percent of maximum engine speed. Accordingly, for engine speeds less than 45 percent of maximum speed, air is supplied to power nozzle 340a and no air is supplied to power nozzle 90a. Thus, no speed error signal is generated. However, the signal indicative of the proper position of metering element 410 within fuel valve 400 is generated between outlet passages 340d and 340e which comprise the signal output of start control circuit 320. Start control circuit 320 functions to provide the proper fuel to air mixture within combustion chamber 57 for optimum engine starting. To provide the proper fuel to air mixture within combustion chamber 57, the proper ratio of air mass flow to fuel mass flow into combustion chamber 57 must be maintained. The air mass flow into combustion chamber 57 is determined from the volumetric air flow rate into combustion chamber 57 and the engine inlet air pressure. The volumetric air flow rate into combustion chamber 57 is a function of compressor speed which is indicated by the pressure differential supplied to control ports 322f and 322g from speed signal conduits 88 and 89. The engine inlet air pressure is determined as previously described by means of air pressure compensation circuit 321. Accordingly, the output signal from amplifier 322 is a fluid pressure differential indicative of a mass air flow rate into combustion chamber 57. This signal is supplied to control ports 340f and 340g through variable gain circuit 330. It has been found that during the start procedure, engine 50 can accept fuel at a relatively faster rate at engine speeds above 18 percent of maximum speed than it can at engine speeds below 18 percent of maximum speed. Accordingly, variable orifice 336 is set such that the output of amplifier 338 switches from outlet passage 338e to outlet passage 338d at 18 percent of maximum engine speed. Thus, the total gain of start control circuit 320 is increased at engine speeds above 18 percent of maximum speed. Amplifier 330 also receives feedback signals indicative of the position of metering element 410 from transducer 345 and functions to supply a signal to amplifier 315 which will position metering element 410 for the proper fuel flow rate to injectors 58.

It should be noted that the failure to supply air to power nozzle 90a not only disables speed signal means 110, but also effectively disables stall signal means 111 and temperature limit signal means 112. This results from the fact that with speed signal means 110 disabled, no speed error signal is produced between outlet passages 90d and 90e. This is necessarily the smallest of the error signals supplied to mode selection circuit 280. Accordingly, no output signal is provided from mode selector 280 and fuel valve apparatus 400 is controlled only in response to start control circuit 320 and the steady state anticipation circuit comprising high pass circuits 303 and 370.

After engine ignition has been established, the speed of engine 50 continues to increase. When the engine speed reaches 45 percent of maximum speed, the output of amplifier 360 switches from outlet passages 360d to outlet passage 360e. The air supply is thus removed from amplifier 340 and start control circuit 320 is disabled. In addition, fluid is supplied to power nozzle 90a and operation of the speed signal, stall signal and temperature limit signal circuits is established. As previously discussed, speed signal means 110 provides a pressure differential output signal indicative of the difference between the actual engine speed and a commanded engine speed. The stall error circuit produces a pressure differential output signal indicative of the difference between the corrected turbine inlet temperature and the incipient stall temperature. Temperature limit error circuit 112 produces a pressure differential output signal indicative of the difference between the actual turbine inlet temperature within engine 50 and the maximum allowable temperature of the engine.

In addition, as has been discussed herein before, mode selection circuits 180 and 280 function to select only the smallest of the speed error, stall error and temperature limit error signals, and transmit only that signal. A signal representative of the smallest of the speed error, stall error and temperature limit error signals is produced at signal output 283 of mode selection circuit 280. This signal is supplied to amplifier 300 through variable gain circuit 290.

As in start control circuit 320, it has been found that at higher engine speeds, engine 50 can accept fuel at a relatively faster rate than it can at lower engine speeds. Accordingly, as the engine speed increases, the pressure supplied to gain control port 292 from amplifier 295 gradually decreases, thus increasing the gain of variable gain circuit 290 and increasing the total gain of control system 51. Since start control circuit 320 is disabled, fuel valve apparatus 400 is controlled only in response to the output signal from variable gain circuit 290 and the output signals from high pass circuits 303 and 370.

It should be pointed out that a pressure at control port 300g which is greater than the pressure at control port 300f tends to cause increased fuel flow through fuel valve apparatus 400. Increased fuel flow to engine 50 normally results in acceleration thereof. Acceleration of engine 50 causes the pressure in speed signal conduit 89 to increase with respect to the pressure in speed signal conduit 88. This results in high pass circuit 303 supplying a pressure signal to control port 300b which is greater than the pressure signal supplied to control port 300c. Accordingly, the signal supplied by high pass circuit 303 opposes the signal supplied by variable gain circuit 290. The result is that as engine 50 accelerates, its rate of acceleration is decrease as the actual speed approaches the commanded engine speed. Accordingly, the actual engine speed is not permitted to overshoot the commanded engine speed.

Conversely, a pressure at control port 300f which is greater than the pressure at control port 300g tends to reduce the fuel flow through fuel valve 400. Reduced fuel flow to engine 50 causes it to decelerate. This results in a decreasing engine speed which causes high pass circuit 303 to supply a pressure signal to control port 300c which is greater than the pressure signal supplied to control port 300b. Thus, the signal provided by high pass circuit 303 tends to oppose the signal supplied by variable gain circuit 290. Accordingly, as engine 50 decelerates, its rate of deceleration decreases as the actual engine speed approaches the commanded engine speed. The actual engine speed is, thus, not permitted to overshoot its commanded steady state value.

High pass circuit 370 provides a negative feedback signal indicative of the rate of change of the position of metering element 410 within fuel valve 400 in a manner similar to that whereby high pass circuit 303 provides a negative feedback signal indicative of the rate of change of engine speed. The operation of high pass circuit 370 in controlling the rate of change of position of metering element 410 within fuel valve 400 need not be described in greater detail. It is sufficient to note that high pass circuit 370 functions to prevent metering element 410 from overshooting and oscillating about its steady state position.

In accordance with the foregoing discussion, the applicants' control system operates to control the flow of fuel to an engine in response to only the most critical of a plurality of engine operating parameters. Further, the applicants have provided a simple, reliable and rugged control system whereby optimum engine performance can be achieved and in which there is no necessity to derate system and engine performance to insure that no important engine operating parameter exceeds its allowable limit.

Although the applicants' invention has been described and illustrated in detail, it should be understood that the same is by way of illustration and example only and is not to be taken by way of limitation. The spirit and scope of this invention are limited only by the terms of the following claims.

What is claimed is:

1. In combination:
   an engine having a propulsion fluid therewithin, said engine including moveable means for extracting energy from the propulsion fluid;
   temperature limit signal means for producing a first fluid signal indicative of the difference between a maximum allowable temperature and a temperature of the propulsion fluid within said engine;
   stall signal means for producing a second fluid signal indicative of a difference between a temperature of the propulsion fluid within said engine and an incipient stall temperature;
   speed signal means for producing a third fluid signal indicative of the difference between the speed of the moveable means and a reference speed;
   first fluidic selection means for accepting a first plurality of fluid signals and transmitting only a selected one of the first plurality of signals;
   means for connecting said temperature limit signal means and said stall signal means to said first fluidic selection means so as to convey the first and second fluid signals thereto, said first fluidic selection means being operable to transmit only a selected one of the first and second fluid signals;
   second fluidic selection means for accepting a second plurality of fluid signals and transmitting only a selected one of the second plurality of signals;
   means for connecting said speed signal means and said first fluidic selection means to said second fluidic selection means so as to convey the third fluid signal and the fluid signal transmitted by said first fluidic selection means to said second fluidic selection means, said second fluidic selection means being operable to transmit only a selected one of the first, second and third fluid signals;
   control means for varying an independent operating variable of said engine in response to a fluid signal; and
   means for connecting said second fluidic selection means to said control means whereby said control means is operable to vary the independent operating variable of said engine at any one time solely in response to a selected one of the first, second and third fluid signals.

2. The combination of claim 1 wherein said control means is operable to vary the independent operating variable of said engine in response to only the smallest of said first, second and third fluid signals.

3. The combination of claim 2 wherein:
   said engine is a gas turbine engine including a compressor and a turbine;
   said speed signal means is responsive to the compressor speed;

said temperature limit signal means is responsive to the turbine inlet temperature; and said stall signal means is responsive to compressor speed and turbine inlet temperature.

4. The combination of claim 3 further including manual speed selection means operable to produce a fourth fluid signal indicative of the reference speed.

5. The combination of claim 4 further including engine starting means comprising:

a first proportional fluid amplifier having first and second pairs of opposing control ports and a pair of outlet passages;

means connecting the first pair of opposing control ports of said first proportional fluid amplifier to said speed signal means;

means adapted to supply an essentially constant fluid signal to each of the control ports of the second pair of opposing control ports of said first proportional fluid amplifier;

means adapted to supply a fluid signal indicative of engine inlet air pressure to only one control port of the second pair of opposing control ports of said first proportional fluid amplifier;

fluidic gain changing means including an input, an output and a gain control port;

means connecting the pair of outlet passages of said first proportional fluid amplifier to the inlet of said fluidic gain changing means;

means connecting the gain control port of said fluidic gain changing means to said speed signal means;

a second proportional fluid amplifier having a power nozzle, first and second pairs of opposing control ports and a pair of outlet passages;

means connecting the output of said fluidic gain changing means to the first pair of opposing control ports of said second proportional fluid amplifier;

a fluid supply circuit having an input and an output;

means connecting the input of said fluid supply circuit to said speed signal means, said fluid supply circuit being operable to provide fluid at its output only if the compressor speed is less than a predetermined speed;

means connecting the output of said fluid supply circuit to the power nozzle of said second proportional fluid amplifier;

sensing means for sensing the independent operating variable, said sensing means operable to provide a fifth fluid signal indicative of the independent operating variable;

means connecting said sensing means to the second pair of opposing control ports of said second proportional fluid amplifier so as to convey the fifth fluid signal thereto; and means connecting the pair of outlet passages of said second proportional fluid amplifier to said control means, said control means being operable to vary the independent operating variable of said engine in response to only compressor speed and engine inlet air pressure for compressor speeds less than the predetermined speed.

6. The combination of claim 5 further including a steady state anticipation circuit comprising:

a first fluidic high pass circuit including an input and an output;

means connecting said speed sensing means to the input of said first fluidic high pass circuit;

means connecting the output of said first fluidic high pass circuit to said control means;

a second fluidic high pass circuit including an input and an output;

means connecting said sensing means for sensing the independent operating variable to the input of said second fluidic high pass circuit; and means connecting the output of said second fluidic high pass circuit to said control means, said control means being operable to vary the independent operating variable of said engine in response to the rate of acceleration of the compressor and the rate of change of the independent operating variable of said engine.

7. The combination of claim 6 wherein the independent operating variable of said engine comprises the rate of fuel flow to said engine.

8. A fluidic air pressure compensation circuit for an engine control system including sensing means for sensing an operating parameter of the engine and control means for controlling an independent operating variable of the engine, said fluidic air pressure compensation circuit comprising:

a proportional fluid amplifier having first and second pairs of opposing control ports and a pair of outlet passages;

means for connecting the sensing means to the first pair of opposing control ports of said proportional fluid amplifier;

means adapted to supply an essentially constant fluid signal to each of the control ports of the second pair of opposing control ports of said proportional fluid amplifier;

means adapted to supply a control port of the second pair of opposing control ports of said proportional fluid amplifier with a fluid signal indicative of an air pressure associated with the engine; and means for connecting the pair of outlet passages of said proportional fluid amplifier to the control means of the engine control system.

9. A fluidic mode selection circuit for an engine control system including means for sensing and providing signals indicative of a plurality of operating parameters of the engine and means for controlling an independent operating variable of the engine, said fluidic mode selection circuit comprising:

first input means for receiving a first signal indicative of a first operating parameter;

second input means for receiving a second signal indicative of a second operating parameter;

first proportional summing means having a first signal input, a second signal input and a signal output;

bistable fluid supply means having an input, a first output and a second output;

means connecting the signal output of said first proportional summing means to the input of said bistable fluid supply means;

a first proportional fluid amplifier having a power nozzle, a signal input and a signal output;

a second proportional fluid amplifier having a power nozzle, a signal input and a signal output;

means connecting the first and second outputs of said bistable fluid supply means to the power nozzles of said first and said second proportional fluid amplifiers respectively;

means connecting said first input means to the first signal input of said first proportional summing means and said signal input of said first proportional fluid amplifier;

means connecting said second input means to the second signal input of said first proportional summing means and the signal input of said second proportional fluid amplifier;

second proportional summing means having a first signal input, a second signal input and a signal output; and means connecting the signal outputs of said first and said second proportional fluid amplifiers to the first and second signal inputs of said second proportional summing means respectively, the signal output of said second proportional summing means being operable to supply a signal for controlling an independent operating variable, the signal supplied at the signal output of said second proportional summing means being a function of only a selected one of the first and second signals dependent on the relative magnitudes thereof.

10. A fluidic air pressure compensation circuit for an engine control system including control means for controlling an independent operating variable of the engine, said fluidic air pressure compensation circuit comprising:

a proportional fluid amplifier having first and second control ports and a pair of outlet passages, signals supplied to the first and second control ports respectively tending to cause signals at different ones of the pair of outlet passages;

means adapted to supply a fluid reference signal to the first control port of said proportional fluid amplifier;

means adapted to supply the second control port of said proportional fluid amplifier with a fluid signal indicative of an air pressure associated with the engine; and means for connecting the pair of outlet passages of said proportional fluid amplifier to the control means of the engine control system.

11. A fluidic acceleration circuit for an engine control system including control means for controlling an independent operating variable of the engine, said fluidic acceleration circuit comprising:

a proportional fluid amplifier having first and second control ports and a pair of outlet passages, signals supplied to the first and second control ports respectively tending to cause signals at different ones of the pair of outlet passages;

sensing means associated with the engine, said sensing means operable to sense engine acceleration and to produce a fluid signal indicative thereof;

means connecting said sensing means to the first control port of said proportional fluid amplifier;

means adapted to supply a reference signal to the second control port of said proportional fluid amplifier; and means for connecting the pair of outlet passages of said proportional fluid amplifier to the control means of the engine control system.

12. Fuel scheduling means for an engine control system including fuel metering apparatus, said fuel scheduling means comprising:

engine speed sensing means operable to produce a first fluid signal indicative of engine speed;

engine inlet air pressure sensing means operable to produce a second fluid signal indicative of engine inlet air pressure;

a fluidic function generator having input means and an output; and means connecting said engine speed sensing means and said engine inlet air pressure sensing means to the inlet means of said fluidic function generator so as to convey the first and second fluid signals thereto, said fluidic function generator operable to produce a fuel metering signal indicative of air mass flow into the engine.

13. A variable lead circuit for an engine control system, said variable lead circuit comprising:

a variable gain fluid circuit including an input, an output and a gain control port;

first signal means operable to produce a first fluid signal indicative of an operating parameter;

a fluidic high pass circuit having an input and an output;

means connecting said first signal means to the input of said variable gain fluid circuit and the input of said fluidic high pass circuit so as to convey the first fluid signal thereto;

second signal means operable to produce a second fluid signal indicative of an operating parameter;

means connecting said second signal means to the gain control port of said variable gain fluid circuit so as to convey the second fluid signal thereto;

summing means; and means connecting the outputs of said variable gain fluid circuit and said fluidic high pass circuit to said summing means.

14. A proportional plus integral control circuit for an engine control system operable to produce a fluid signal indicative of commanded control over an independent operating variable, said proportional plus integral control circuit comprising:

summing means having a first input for accepting a fluid command signal, a second input for accepting a fluid feedback signal and an output;

actuator means for controlling an independent operating variable in response to a fluid input signal, said actuator means responding integrally to the fluid input signal;

means connecting the output of said summing means to said actuator means;

signal means associated with said actuator means for providing a fluid position signal indicative of the state of said actuator means;

a fluidic high pass circuit having an input and an output;

means connecting said signal means to the input of said fluidic high pass circuit so as to convey the fluid position signal thereto, said fluidic high pass circuit producing a fluid feedback signal in response to the fluid position signal; and means connecting the output of said fluidic high pass circuit to the second input of said summing means so that the fluid feedback signal opposes a fluid command signal supplied to the first input of said summing means.

* * * * *